United States Patent [19]

Narayanan et al.

[11] Patent Number: 5,594,874
[45] Date of Patent: Jan. 14, 1997

[54] AUTOMATIC BUS SETTING, SENSING AND SWITCHING INTERFACE UNIT

[75] Inventors: Puducode S. Narayanan, Sunnyvale; Tai T. Nguyen, San Ramon; Arunachalam Vaidyanathan, Fremont; Edward C. Garcia, Milpitas, all of Calif.

[73] Assignee: Cirrus Logic, Inc., Fremont, Calif.

[21] Appl. No.: 130,090

[22] Filed: Sep. 30, 1993

[51] Int. Cl.⁶ .................................................. G06F 13/00
[52] U.S. Cl. .................. 395/284; 395/828; 364/DIG. 1; 364/238.2; 364/240
[58] Field of Search .................................... 395/325, 275, 395/500, 280, 284, 282, 829, 830, 497.01, 828

[56] References Cited

U.S. PATENT DOCUMENTS

| | | | |
|---|---|---|---|
| 4,075,693 | 2/1978 | Fox et al. | 395/325 |
| 4,683,534 | 7/1987 | Tietjen et al. | 395/325 |
| 4,716,525 | 12/1987 | Gilanyi et al. | 395/325 |
| 4,727,475 | 2/1988 | Kiremidjian | 395/284 |
| 4,775,931 | 10/1988 | Dickie et al. | 395/275 |
| 4,807,282 | 2/1989 | Kazan et al. | 379/284 |
| 4,935,894 | 7/1990 | Ternes et al. | 395/325 |
| 5,038,320 | 8/1991 | Heath et al. | 395/830 |
| 5,043,877 | 8/1991 | Berger et al. | 395/280 |
| 5,175,536 | 12/1992 | Aschliman et al. | 340/825.04 |
| 5,191,653 | 3/1993 | Banks et al. | 395/275 |
| 5,245,703 | 9/1993 | Hurbert | 395/325 |
| 5,255,376 | 10/1993 | Frank | 395/325 |
| 5,263,172 | 11/1993 | Olnowich | 395/800 |
| 5,280,587 | 1/1994 | Shimodaira et al. | 395/275 |
| 5,371,892 | 12/1994 | Petersen et al. | 395/284 |
| 5,376,928 | 12/1994 | Testin | 340/825.5 |
| 5,379,384 | 1/1995 | Solomon | 395/325 |
| 5,386,517 | 1/1995 | Sheth et al. | 395/275 |
| 5,408,616 | 4/1995 | Aho et al. | 395/284 |
| 5,420,987 | 5/1995 | Reid et al. | 395/830 |
| 5,454,081 | 9/1995 | Thome | 395/284 |

OTHER PUBLICATIONS

Rockwell International R65C00/21 Dual CMOS Microcomputer and R65C29 Dual CMOS Microprocessor Data Book, pp. 3–22 Through 3–24, Aug. 1983.

*Primary Examiner*—Ayaz R. Sheikh
*Attorney, Agent, or Firm*—Haverstock & Associates

[57] ABSTRACT

An integrated automatic bus setting, sensing and switching interface unit is manufactured on board an integrated circuit to interface between the integrated circuit and the system bus. The interface unit can support a plurality of bus structures utilizing the same pins on the integrated circuit for different functions. Several modes of establishing an interface structure are available in the unit. An Address Strobe pin on the integrated circuit is used to automatically detect a signal level representative of the bus structure to be used. A code representative of the parameters of the bus structure is also stored in a configuration register for controlling the interface unit and configuring the pins on the integrated circuit for the specific bus structure to be used. The Basic Input Output System (BIOS) as its first operation stores the code in a register whose contents are then written to the configuration register of the integrated circuit for controlling and configuring the integrated circuit. A combination of these modes is also available.

59 Claims, 15 Drawing Sheets

AUTOMATIC BUS SETTING, SENSING AND SWITCHING INTERFACE UNIT

FIELD OF THE INVENTION

This invention relates generally to integrated circuit design involving the interfaces to differing bus protocols. More particularly, the invention relates to an integrated circuit design which automatically senses, recognizes and adapts to various bus protocols.

BACKGROUND OF THE INVENTION

In order for circuits within a computer system to easily communicate with other circuits, system busses were introduced. A system bus consists of multiple lines, including address lines, data lines, Read/Write or handshake lines and other control signal lines. System busses tend to be asynchronous in nature with the data signal lines sending the appropriate data to a device whose address is specified on the address lines, in response to handshake signals. For example, a bus would allow a Central Processing Unit (CPU) to read and write data into specific memory locations in a Random Access Memory (RAM).

The size of a system bus is dependent on the capabilities of the CPU which is used to control the system bus. Originally, system busses were as small as 4 bits in data width. As integrated circuit technology has improved, metal line widths and metal spacing within integrated circuits has decreased, allowing the width of a microprocessor's data bus to increase to 32 bits, which is commonly used in conjunction with current technology. In the future, data busses will grow wider, as the technology progresses.

As the width of data busses has increased, the width of the address bus used by present systems has also increased. A 32 bit address bus is now commonly used, giving a 32 bit microprocessor direct address space exceeding one gigabyte.

Due to the increase in the width of busses, additional pins are now required when designing an integrated circuit package which is to communicate with a microprocessor. As the number of pins has increased, due to the increase in the size of the system bus necessary, the costs of producing an integrated circuit have also increased to the point that the cost of the integrated circuit package now typically exceeds the cost of the fabricated die contained within. For these reasons, it has now become important to limit the number of pins required in an integrated circuit package by using individual pins for multiple functions in order to decrease costs and minimize the space required for the placement of the integrated circuit.

Integrated circuits in the prior art have time multiplexed address signals and data signals onto the same pins, using a single pin as an address pin during one period of time and then using the same pin as a data pin during a later period of time. Another method used to multiplex functions on a single pin is to have a pin function in one manner during the power up sequence of a system and then in a second manner during normal operation of the system. In other cases, a pin may function differently depending upon the mode or operating context of the integrated circuit.

Various microprocessor manufacturers have previously supported differing types of hand shake mechanisms. For example, the hand shake mechanism of the VME bus is supported by Motorola's 68XXX series of microprocessors and hand shaking of the ISA bus is supported by Intel's 8086, 80286 and 80386 microprocessors.

Bus types also differ in that they may be synchronous or asynchronous. Asynchronous busses use hand shake mechanisms to transfer data bus information between different circuits. The bus is asynchronous because it will operate at irregular intervals without reference to a central timing clock or source. Synchronous busses, on the other hand have a separate clock signal included as a part of the system bus which requires the circuits to perform operations in response to the common clock signal. Data transfer rates of synchronous busses are faster than asynchronous busses but the system bus is required to have a greater signal count because it includes the clock signal. In certain applications the clock signal can be increased to twice its previous value which also improves the data transfer rate of a synchronous bus.

Computer manufacturers have typically designed the internal computer system bus structure around the microprocessor that they support. Because each manufacturer supports its own microprocessor, numerous bus structures have been developed and become standards. IBM developed and uses the ISA bus standard for the IBM PC system bus structure, Apple Computer has developed and uses the NUBUS standard for the system bus structure of some Macintosh computers, Intel has developed and uses the PI bus standard and VESA (Video Electronics Standard Association) has developed and uses the Local Bus standard (VL Bus). Other known bus standards are SBus, Micro Channel, EISA Bus, Multibus 1, GIO Bus, Q22 bus and TURBOchannel. There are many other bus structures used within various electronic equipment, but most of these system busses have not become popular standards because the equipment is not used widely or the system bus is proprietary and is not disclosed.

Of interest herein are the computer system busses developed around Intel's family of microprocessors, including the ISA bus, the PI bus and the Local bus. However, it will become clear that the present invention can be applied to other bus structures as well.

The ISA bus standard is used in almost every IBM PC or PC clone and accordingly has become a very popular bus standard. The ISA bus standard was created by IBM and has a 16 bit wide data path and a 24 bit wide address bus. The ISA bus is asynchronous and originally operated with system clock rates of 8 MHz. Because the ISA bus standard has remained fixed, it has become limited for use in conjunction with modern high speed microprocessors.

The PI bus standard was created by Intel Corporation for use in notebook and laptop computers. The PI bus standard has power saving features as well as a faster bandwidth rate than the ISA bus standard. The PI bus standard also utilizes a 16 bit wide data bus and a 24 bit wide address bus.

The specifications for the Local (VL) bus standard were developed by the Video Electronics Standard Association (VESA). The Local bus has a higher data transfer rate than the ISA bus or the PI bus. The Local bus has a 32 bit wide data bus and a 32 bit wide address bus. The bus is synchronous and designed for a system clock rate of 33 MHz. The Local bus is designed such that a higher system clock rate can be utilized. The Local bus can be configured to run with a 16 bit or 32 bit wide data bus, depending on the microprocessor that is used. Similarly, the Local bus can also be configured to run with a 1X clock or a 2X clock, depending on the capabilities of the microprocessor.

Within the computer, boards and circuits that communicate with the bus have interface circuitry which supports the appropriate bus standard. For example IBM PC circuits would be specially designed to interface with an ISA bus that used an Intel microprocessor. Other circuits would be specially designed to interface with a local bus standard. These boards are usually connected to a mother board inside of a personal computer to add further flexibility and to facilitate expansion. Some of the more popular boards which can be added to a computer system are serial I/O, MODEM controller, VGA video controller, hard disk controller and ethernet interface cards. The functionality of many of these cards have now been integrated onto a single chip allowing individual chips to directly interface with the system bus, particularly in portable or laptop computers.

Integrated circuit designers have tried to design a single chip which supports multiple bus standards to allow system or board designers to design boards that adapted to the various bus standards, using the same integrated circuit. In addition, the ability to upgrade the system board by simply plugging in a new advanced microprocessor has been desired by board designers. In this manner the number of parts kept in inventory would decrease for board and integrated circuit manufacturer alike.

Integrated circuits of the prior art have provided some bus flexibility to a board designer by programming the bus type into the chip using resistors as illustrated in FIG. 1. The resistors 130 and 131 illustrate how a resistor can be soldered onto a circuit board to respectively pull-up and pull-down the input pins 106 and 107 of the integrated circuit 133. To pull up the input pin 106, the resistor 130 is coupled between the input pin 106 and the power supply VDD. To pull down the input pin 107, the resistor 131 is coupled between the input pin 107 and the ground GND. For connection to a different bus type, for example, the resistors 130 and 131 could be configured such that the resistor 130 would pull-down and the resistor 131 would pull-up the input pins 106 and 107, respectively.

Another hardware method used in the prior art to support multiple bus selections uses dip switches to select from a plurality of busses. Using dip switches to select a bus type allows greater flexibility than the soldering method, using resistors. Dip switches are typically available in packages which include multiple switches. For example, FIG. 1 illustrates a dip switch package 132 which includes the 8 dip switches 122–129. A dip switch has two positions, either the dip switch is off or the dip switch is on. In the ON position, the dip switch is closed, as illustrated by the dip switch 123. In the OFF position, the dip switch is open, as illustrated by the dip switch 122. In the configuration illustrated by FIG. 1, the input pins 108–111 of the integrated circuit 133 can be selectively pulled-up or pulled-down by appropriately opening or closing the dip switches 122–129. For example, the input pin 108 is pulled-down by closing the dip switch 123 and opening the dip switch 122. The input pin 109 is pulled-up by closing the dip switch 124 and opening the dip switch 125. In this manner, the four input pins 108–111 can be configured to select 16 different bus types.

Typically, two bus types have been supported within integrated circuits depending on the type of microprocessor used within the computer. The Intel 80X86 and the Motorola 68000 microprocessors have been the most used, but with the growing number of computer manufacturers, more specialized bus types have been developed around the different computer systems.

In another prior art method used within Rockwell's R65C29 microprocessor, a different microprocessor's handshake signals have been set up using registers. The host computer in this instance can be either Zilog Z80/Intel 8080 or Rockwell 6500/Motorola 6800 set by Bit 0 of the Host Control and Status Register (HCSR). In this instance the actual bus size did not increase because the interface remains at 8 data bits and 16 address bits. A disadvantage of this register method is that the microprocessor does not automatically recognize the bus type and adapt accordingly.

Some disadvantages to the hardware methods of the prior art are that the extra components use valuable board space, decrease system reliability and increase system costs. Another disadvantage is that power is consumed by these hardware methods from leakage currents. While this power consumption is not significant in circuit boards powered through an AC/DC power supply converter, it is likely to be significant in portable equipment. Because of the increase in miniaturization and portability it is desirable to eliminate these components to conserve critical space, increase reliability and reduce system costs. Eliminating or reducing the number of pull-down and pull-up resistors could decrease power consumption in portable equipment that relies on a self contained power supply such as a battery.

What is needed is an apparatus which eliminates the use of passive components such as dip switches and resistors within computer systems to select the interface to a particular bus system protocol. What is further needed is an apparatus which can automatically sense the bus system type interfacing to an integrated circuit, in order to correctly adapt to the protocol and physical properties of that bus. What is also needed is a way to more efficiently use the pins of an integrated circuit package and thereby reduce the costs associated with the integrated circuit package and to conserve board space. What is also needed is a way to reduce the power consumed by the integrated circuit package and to reduce costs by eliminating the storage of alternate inventory necessary to support multiple bus protocols.

SUMMARY AND OBJECTS OF THE INVENTION

An integrated automatic bus setting, sensing and switching interface unit is manufactured on board an integrated circuit to interface between the integrated circuit and the system bus. The interface unit can support a plurality of bus structures utilizing the same pins on the integrated circuit for different functions. Several modes of establishing an interface structure are available in the unit. An Address Strobe pin on the integrated circuit is used to automatically detect a signal level representative of the bus structure to be used. A code representative of the parameters of the bus structure is also stored in a configuration register for controlling the interface unit and configuring the pins on the integrated circuit for the specific bus structure to be used. The Basic Input Output System (BIOS) as its first operation stores the code in a register whose contents are then written to the configuration register of the integrated circuit for controlling and configuring the integrated circuit. A combination of these modes is also available.

It is an object of the invention to eliminate the use of passive components such as dip switches and resistors within computer systems normally used to select the interface to a particular bus system protocol.

It is a further object of the present invention to automatically sense the bus system type interfacing to a circuit containing the present invention, in order to correctly adapt to the protocol and physical properties of that bus.

It is a further object of the present invention to more efficiently use the pins of an integrated circuit package and thereby reduce the costs associated with the integrated circuit package.

It is a further object of the present invention to reduce the power consumed by the integrated circuit package.

It is still a further object of the present invention to conserve board space.

It is still a further object of the present invention to reduce costs by eliminating the storage of alternate inventory necessary to support multiple bus protocols.

BRIEF DESCRIPTION OF THE DRAWINGS

FIG. 12 is a diagram illustrating how the block diagrams of FIGS. 12A and 12B are to be assembled.

DETAILED DESCRIPTION OF THE PREFERRED EMBODIMENT

Figure 1:
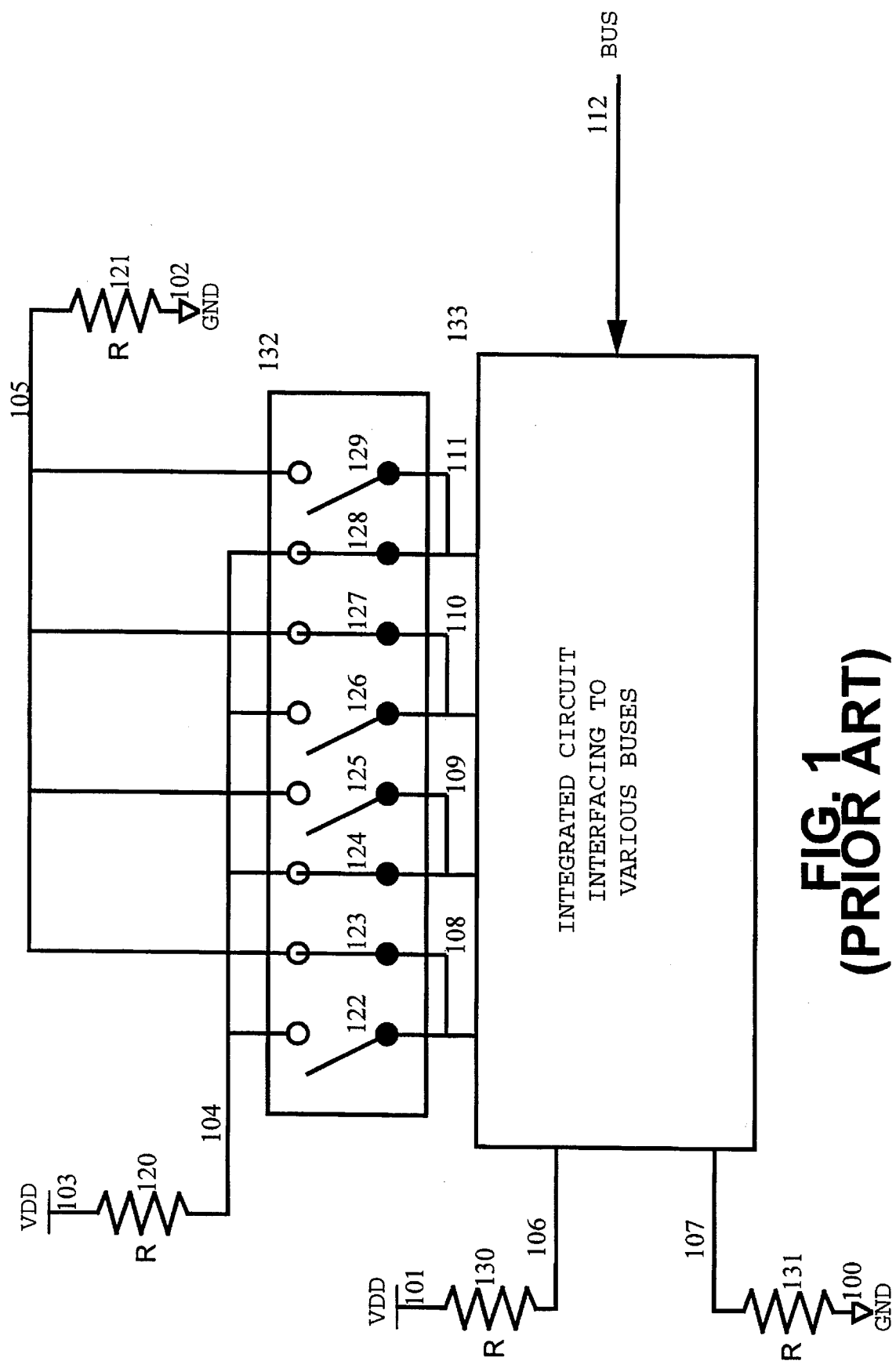
FIG. 1 illustrates the prior art use of pull-up resistors, pull-down resistors and dip switches to select the type of bus structure that interfaces to an integrated circuit.

The automatic bus setting, sensing and switching apparatus of the present invention is a logical portion of a peripheral device within an electronic system such as a computer. The automatic bus setting, sensing and switching apparatus of the present invention automatically adapts to interface to the appropriate system bus using no external passive components such as dip switches or resistors. The software, an internal register and the logic described herein provide a peripheral device with the ability to adapt between multiple bus structures. The preferred embodiment of the present invention automatically adapts to the three most popular bus protocols ISA, PI and Local (VESA). However, it should be apparent to one of ordinary skill in the art that the present invention could be extended to support other bus standards or protocols presently available, as well as others that may be developed in the future. The automatic bus setting, sensing and switching apparatus of the present invention is automatic in the sense that it automatically senses the type of bus and appropriately configures itself to that system bus. Functionality of the pins is maximized in order to more efficiently use all of the pins available.

Using the automatic bus setting, sensing and switching apparatus of the present invention a system or board designer can configure an integrated circuit bus interface automatically through the use of software alone or through the use of software and a minimal amount of hardware internal to the chip. In the example of a motherboard designed with a 32 bit wide data path using the presently available 32 bit Intel 386DX CPU, a device containing the present invention could automatically sense an upgrade of the CPU. By replacing the 32 bit Intel 386DX CPU, which uses a 2X clock speed, with an Intel 486DX, which uses a 1X clock speed, the peripheral devices around the CPU can automatically adjust to the change in clock speeds. In the same manner, a 16 bit CPU can be replaced with a 32 bit CPU and the peripheral devices around the CPU can automatically utilize the full 32 bit wide data path. Thus, a personal computer's motherboard can be designed for a future upgrade as the prices for the higher performance microprocessor decline.

In order to automatically determine which bus structure the microprocessor is using the automatic bus setting, sensing and switching apparatus of the present invention monitors the Address Strobe (ADS*) pin of a device containing the present invention. The logic included in the present invention detects the logic level as well as the presence of logic transitions on the ADS* pin if any. The connection is made to the ADS* pin by the system designer. If the microprocessor is using an ISA bus system, the system designer connects the ADS* pin to the ground and the level detection logic activates a bus-type signal inside of the chip, modifying the pad controls as needed by the ISA bus interface. If the microprocessor is using a PI bus system, the system designer connects the ADS* pin to the positive power supply voltage and the level detection logic activates a bus-type signal inside of the chip, modifying the pad controls as needed by the PI bus interface. If the microprocessor is using a Local bus system, the system designer connects the ADS* pin of the integrated circuit to the Local bus signal ADS*, which switches every processor cycle. The transitions on the ADS* pin are detected and the interface unit is properly configured to interface with the Local bus.

The ISA bus standard and the PI bus standard both have fixed parameters which cannot be varied. Because the parameters cannot be varied, no extra controls are needed when either an ISA or a PI bus standard is used.

The Local bus standard, in contrast to the ISA or PI bus standards, does have parameters which can vary depending on the microprocessor used, mandating that extra controls are used. The Local bus standard (VL bus) has a generic 32 bit wide data path. The Local bus standard is also used in applications where the data bus width is only 16 bits, as in computer systems based on Intel 386SX processors or 386SX clones, which have a 16 bit wide data bus. Additionally, the synchronous clock used by a Local bus may vary depending on the configuration. In most cases a Local bus having a frequency clock of 33 MHz and a clock speed of 1X MHz would have a CPU clock at 33 MHz. Systems which use the Intel 386DX or compatible processors are 2X clock systems while those that use the Intel 486DX or compatible processors are 1X clock systems.

The present invention also includes extra controls which allow the parameters of a Local bus to change depending on the microprocessor to be supported. The interface unit can conform to the size of the data bus and the synchronous clock frequency that is being used by the microprocessor. The system Basic Input Output System (BIOS) performs Input/Output writes into the configuration registers ST100 and ER99. Initially, when the Local bus is detected, the present invention assumes that the data bus is 16 bits wide and that the synchronous clock is operating at a 1X clock speed. The system BIOS has prior knowledge of the type of bus interface required and writes the appropriate bit pattern into the configuration register. Thereafter, the system BIOS completes initialization of the remaining portions of the computer system.

The automatic bus setting, sensing and switching apparatus of the present invention is a solution involving hardware and software eliminating the need for switches and resistors, as used in the prior art. In order to automatically select bus types, the present invention utilizes a combination of logic hardware and software/firmware accessible registers. Two types of software/firmware may interface to the invention; System BIOS and Video BIOS. To support the invention, six lines of code are added to the System BIOS or the VGA BIOS.

Figure 2:
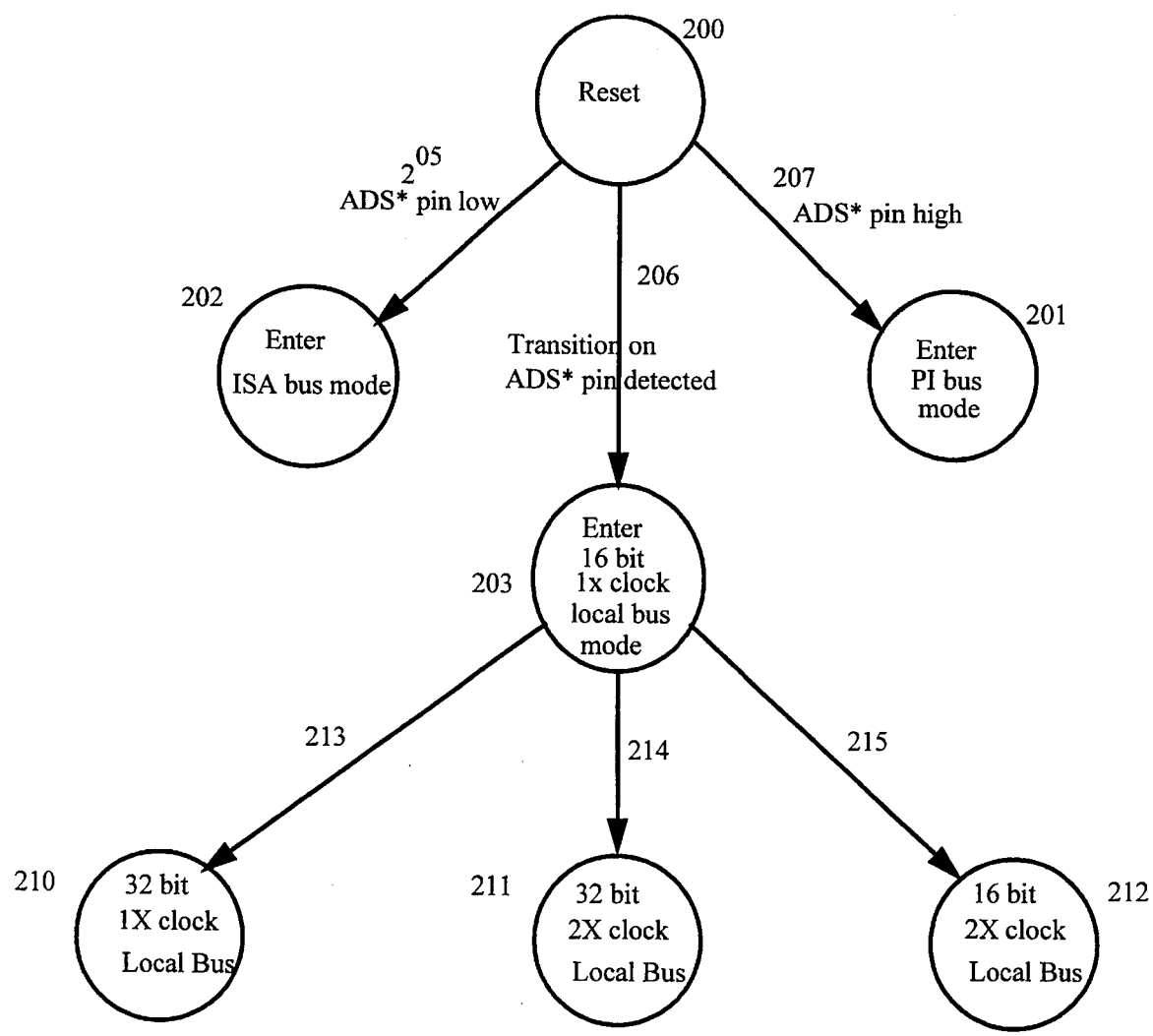
FIG. 2 illustrates the state transition diagram of the bus interface type detection hardware logic of the present invention.

The FIG. 2 illustrates a state transition diagram illustrating the operation of the present invention. The automatic bus setting, sensing and switching apparatus of the present invention is first reset and enters the state 200. If the ADS* pin is at a logical low voltage, indicated by the step 205, the device enters the ISA bus mode in the state 202. If the ADS* pin is at a logical high voltage, indicated by the step 207, the device enters the PI bus mode in the state 201. If the ADS* pin transitions between a logic high voltage level and a logic low voltage level, the device of the present invention enters the Local bus mode in the state 203, assuming a 16 bit data bus and a 1X clock. The BIOS will then write to the configuration register ST100 and the register ER99, as will be explained below, to configure the integrated circuit for interfacing with either a 32 bit, 1X clock bus structure, a 32 bit, 2X clock bus structure or a 16 bit, 2X clock bus structure. This is done to prevent unintended alteration of the bus interface type by programs that may perform I/O writes to another port with the same address, elsewhere in the system.

Figure 3:
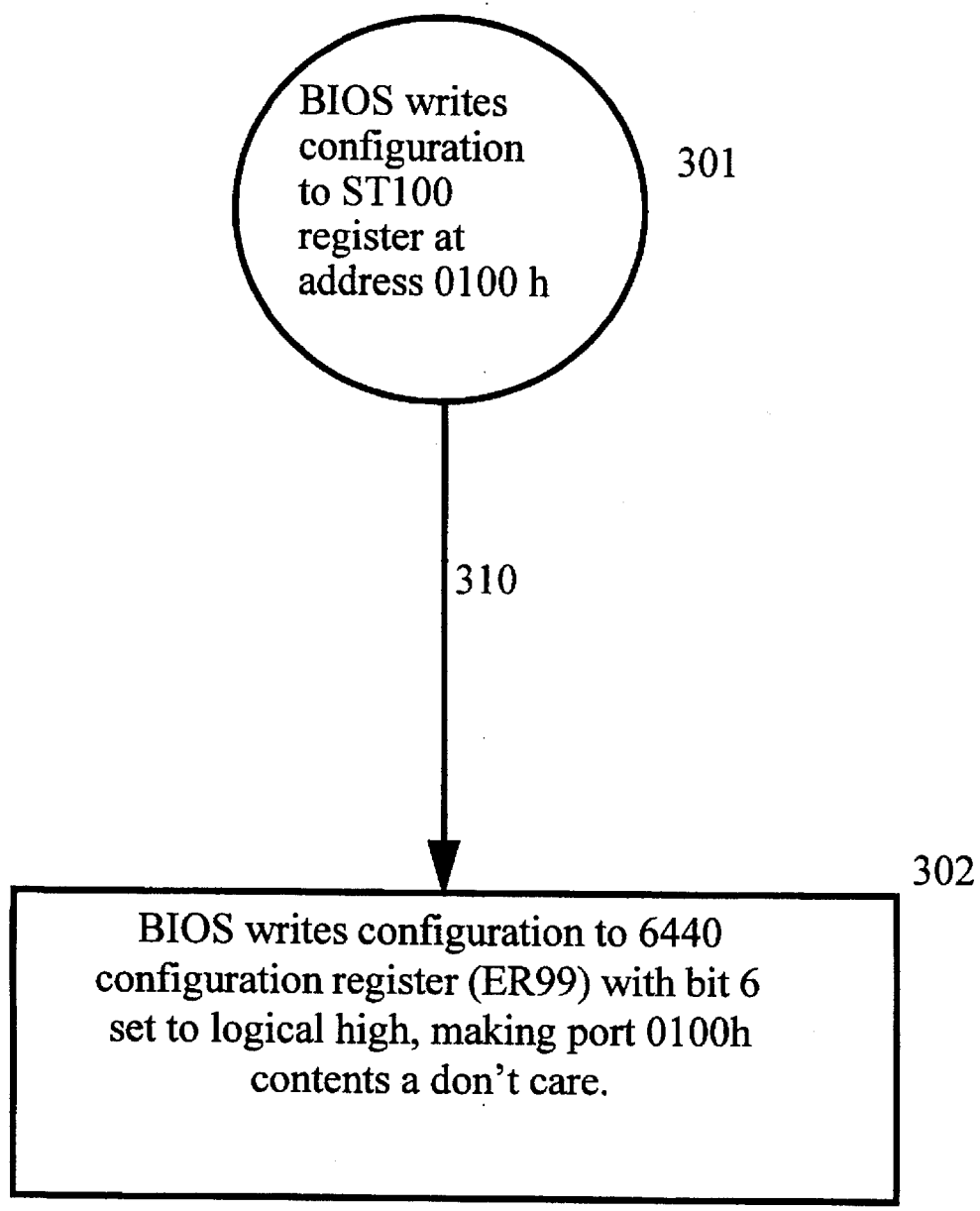
FIG. 3 illustrates the steps that are performed by the BIOS in order to properly configure the chip to support the desired bus structure.

FIG. 3 illustrates a state diagram showing the steps that are performed by the BIOS in order to properly configure the integrated circuit to support the desired type of Local bus. The BIOS writes the configuration commands to the configuration register ST100 at address 0100 h as illustrated in the state 301. The Video BIOS then writes the contents of the configuration register ST100 to the configuration register ER99 and disables the register ST100, making the contents of the register a "don't care" value as illustrated in the state 302. Once the contents of the register ST100 have been written to the register ER99, the register ST100 is disabled so that it can no longer be used by the integrated circuit. On a power-up signal or a reset signal, the register ST100 will be re-enabled and used to program the interface unit.

Figure 4A:
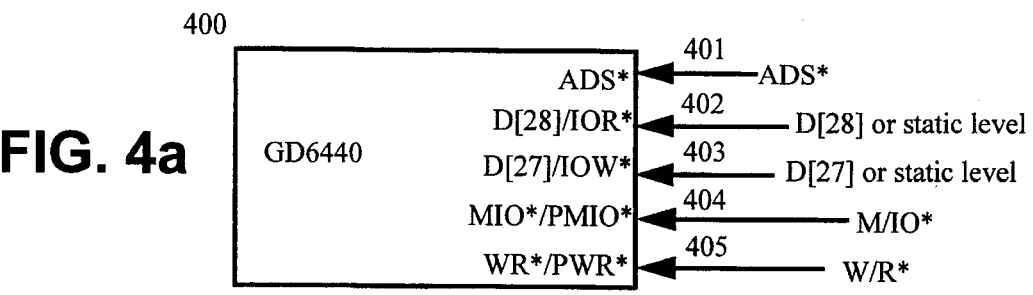
FIG. 4a illustrates the pin connections for a Local/VESA bus interface.

The FIG. 4a illustrates the present invention interfacing to a Local bus system. In the case of a 16 bit Local bus, the D[28]/IOR* pin 402 and the D[27]/IOW* pin 403 would not be driven by any source. In the case of a 32 bit Local bus, the D[28]/IOR* pin 402 and the D[27]IOW* pin 403 would be connected to the data bus pins D[28] and D[27]. The pin MIO*/PMIO* 404 is coupled to the data bus memory I/O pin MIO*. When the device is interfacing to a Local bus, the memory I/O pin MIO* is used to indicate whether a memory or I/O operation is to occur. If the memory I/O pin MIO* is at a logical high voltage level, a memory operation will occur. If the memory I/O pin MIO* is at a logical low voltage level, either an input or an output operation will occur. The WR*/PWR* input pin 405 is coupled to the data bus write/read pin WR*. When the device is interfacing to a Local bus, the write/read pin WR* is used to indicate whether a write or read operation is to occur. If the WR* pin is at a logical high voltage level, a write will occur. If the WR* pin is at a logical low voltage level, a read will occur.

Figure 4B:
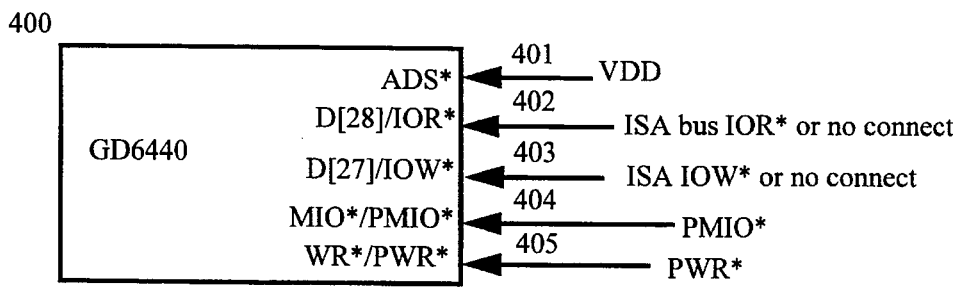
FIG. 4b illustrates the pin connections for a PI bus interface.

The FIG. 4b illustrates the present invention interfacing to a PI bus system. The Address Strobe (ADS*) is an active-low input that indicates that a new cycle has begun in the case of a Local bus. However, because the system is to interface to a PI bus system, the ADS* pin is coupled to the power supply VDD, pulling it high. The D[28]/IOR* pin 402 and the D[27]/IOW* pin 403 are not connected. When the device of the present invention is interfacing to a PI bus system, the pin MIO*/PMIO* 404 is coupled to the data bus memory I/O pin PM/IO*. When the memory I/O pin PM/IO* is at a logical high voltage level, a memory operation will occur. When the memory I/O pin PM/IO* is at a logical low voltage level, an input or output operation will occur. When the device of the present invention is interfacing to a PI bus system, the input pin WR*/PWR* is coupled to the data bus write/read pin PWR*. The write/read pin PWR* works in conjunction with the memory I/O pin PM/IO*. When the write/read pin PWR* is at a logical high voltage level, a write access will occur. When the write/read pin PWR* is at a logical low voltage level, a read access will occur.

Figure 4C:
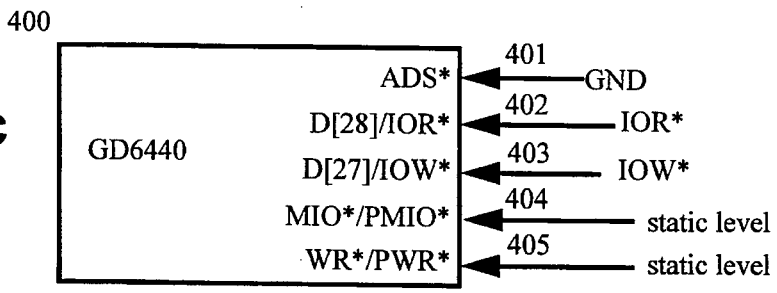
FIG. 4c illustrates the pin connections for an ISA bus interface.

The FIG. 4c illustrates the present invention interfacing to an ISA bus system. Because the system is to interface to an ISA bus system, the ADS* pin is coupled to the ground GND, pulling it low. When the device of the present invention is interfacing to an ISA bus system, the D[28]/IOR* pin 402 is coupled to the data bus I/O Read pin IOR* which is active low and used to indicate that an I/O read is taking place. When the device of the present invention is interfacing to an ISA bus system, the D[27]/IOW* pin 403 is coupled to the data bus I/O Write pin IOW* which is active low and used to indicate that an I/O write is taking place. When the device of the present invention is interfacing to an ISA bus system, the pin MIO*/PMIO* 404 and the pin WR*/PWR* 405 are at a static level.

FIGS. 4a, 4b and 4c illustrate the connections of only some of the pins on the integrated circuit of the preferred embodiment. The remainder of the pins on the integrated circuit may also be used for multiple functions in the same manner, depending on the bus structure used.

If the device of the present invention is interfacing to a PI bus structure or an ISA bus structure, the ADS* pin is used to notify the interface which bus structure it should configure itself for. If the device of the present invention is interfacing to a Local bus structure, the ADS* pin is used to notify the interface to configure itself for a Local bus structure, but the configuration registers ST100 and ER99 are also used to notify the interface which type of Local bus structure is being used. As noted above, once the interface unit senses the transition signals on the ADS* pin, it assumes a Local bus structure with a data width of 16 bits and a 1X clock signal. If a Local bus structure is to be used, then the BIOS will configure the ST100 register and the ER99 register to indicate the parameters of the Local bus structure, including clock speed and data width.

The power-up configuration register ST100 is located in the standard address space 100 h. The register ST100 is written to by the BIOS at power-up and is the first input to the interface circuit before the circuit can be programmed. The power-up configuration register ST100 is used to program the parameters of data bus width and clock speed into the circuit, if a Local bus structure is to be used. The register ST100 is an eight-bit register, having bits numbered 0 through 7. The least significant bit, bit 0, of the register ST100 specifies the bus data width to be used if a Local bus interface is detected. When the bit 0 is a logical low voltage, a 16-bit bus data width is selected and when the bit is a logical high voltage, a 32-bit bus data width is selected. The most significant bit, bit 7, of the register ST100 specifies the clock that will be used. When the bit 7 is a logical low voltage, a 1X clock speed will be used and when the bit 7 is a logical high voltage, a 2X clock speed will be used.

In the preferred embodiment of the present invention, the bits 4–6 of the register ST100 are reserved and should be programmed at a logical low voltage. In another embodiment, these bits may be used to specify another condition or additional bus structures. The bit 3 of the register ST100 signifies the sleep address to be used. If the bit 3 is a logical low voltage, then the sleep address is 3C3h and if the bit 3 is a logical high voltage, then the sleep address is 46E8h.

The bits 1 and 2 of the register ST100 are used to specify the CPU bus type to be used. While the CPU bus type to be used is actually determined at power on reset from the ADS* pin, these two bits in the register ST100 are used as an indicator. The two bits 1 and 2 of the register ST100 can also be used to override the hardware determined value. If both of the bits 1 and 2 of the register ST100 are a logical low voltage, then a local bus structure is specified. If the bit 2 is a logical low voltage and the bit 1 is a logical high voltage, then a PI bus structure is specified. If the bit 2 is a logical high voltage and the bit 1 is a logical low voltage, then an ISA bus structure is specified. Finally, if both of the bits 1 and 2 are a logical high voltage then no bus structure is specified because this condition is reserved.

In the preferred embodiment of the invention both the ADS* pin and the configuration registers ST100 and ER99 are used to specify the bus type to be used. If the ADS* pin and the configuration registers ST100 and ER99 are not programmed to be compatible, then a system error will occur. The configuration register ER99 can also be hard-wired, as will be explained later, to override both the ADS* pin and the configuration register ST100.

To program the register ST100 an eight-bit binary data value must be written to it by the BIOS. After power-up the write operation to the register ST100 will be the first instruction accomplished by the BIOS, to configure the interface circuit for the bus structure to be used. The only code that needs to be added to the BIOS to perform this write instruction is the following six lines of assembly language code:

MOV DX, 0100
MOVAX, (binary 8-bit pattern), (binary 8-bit pattern)
OUT DX, AX
MOV DX, 3CE
MOV AX, (binary 8-bit pattern+40 h), 99
OUT DX, AX The first instruction of this code specifies the address, 0100, that the data is to be written to and puts the value on the address lines. The second instruction specifies the data value which is to be written to the location on the address lines. The data registers used are 16-bit registers, with the first eight bits representing a pointer register and the second eight bits representing the data to be stored. In the design of the preferred embodiment of the present invention, the binary eight bit pattern must be repeated twice in the second instruction even though the register ST100 is an 8-bit register. The data value which corresponds to the bus structure to be used should be placed in the instruction. For example, the data value for a Local bus structure using a 16-bit data width, a 2X clock and a Sleep address of 3C3H would have a binary pattern of 10000000. The third instruction in the lines of code above writes the value of the data lines into the address specified on the address lines. After these three lines of code are executed the data value for the local bus structure to be used will be stored in the register ST100.

After the register ST100 has been programmed, the register ER99 is programmed almost identically to the register ST100. To program the register ER99 the BIOS will write the contents of the register ST100 to the register ER99 and then disable the register ST100, making the contents of the register ST100 a don't care. The BIOS will perform the fourth through the sixth instructions. The fourth instruction of this code specifies the address, 3CE, of the index register and puts the value on the address lines. The register ER99 in the preferred embodiment of the present invention is accessible at the I/O Port Addresses of 3CE and 3CF. The fifth instruction specifies the data value which is to be written to the location on the address lines. A logical "OR" operation should be performed between the binary eight bit pattern, from the second instruction, and the hex value 40. This "OR" operation will set the sixth bit of the register ER99 and will disable the register ST100. The value 99 in the fifth instruction is the index value of the register ER99. The last instruction in the above lines of code, writes the value on the data lines into the address specified on the address lines.

The register ER99 is also an eight-bit register, having bits numbered 0 through 7, which is updated at reset. The most significant bit, bit 7, of the register ER99 is also used to specify which clock will be used when a Local bus structure is to be used. The function of the bit 7 depends on the setting of the bits 1 and 2 specifying which bus structure is to be used. As described above with respect to the register ST100, the bits 1 and 2 specify which bus structure is to be used. If both of the bits 1 and 2 of the register ER99 are a logical low voltage, then a local bus structure is specified. If the bit 2 is a logical low voltage and the bit 1 is a logical high voltage, then a PI bus structure is specified. If the bit 2 is a logical high voltage and the bit 1 is a logical low voltage, then an ISA bus structure is specified. Finally, if both of the bits 1 and 2 are a logical high voltage then no bus structure is specified because this condition is reserved. The type of bus structure can be specified by the binary code forced into the register ER99 at reset when the ADS* pin is not being used to automatically sense the type of bus structure used, with external pull-up or pull-down resistors as exist in the prior art.

If a Local bus structure is specified on the bits 1 and 2 then a logical low voltage on the bit 7 will specify that a 1X clock will be used and a logical high voltage on the bit 7 will specify that a 2X clock will be used. If a PI bus structure is specified on the bits 1 and 2, then a logical low voltage will specify that Input/Output will occur through the PI bus and a logical high voltage will specify that Input/Output will occur through the Input/Output pins on the ISA bus.

The function of the bit 0 also depends on the value of the bits 1 and 2 and the bus specified by those bits. If a Local bus structure is specified by the bits 1 and 2, then a logical low voltage specifies that a 16-bit data bus is selected and a logical high voltage specifies that a 32-bit data bus is selected. If a PI bus structure is specified by the bits 1 and 2 then the bit 0 has no function. If an ISA bus structure is specified by the bits 1 and 2 then the bit 0 specifies the address at which the BIOS will be stored.

The bit 6 of the register ER99 is used to disable the effect of the register ST100. If the bit 6 of the register ER99 is set to a logical high voltage then the effect of the register ST100 is disabled. The bit 5 is used to control the VGA address space. The bit 4 is used to control the width of the BIOS. When the bit 4 is a logical low voltage the BIOS is set to an eight-bit width and the bit 4 is a logical high voltage the BIOS is set to a sixteen-bit width. As described above in reference to the register ST100, the bit 3 of the register ER99 is used to define the sleep location.

Figure 5:
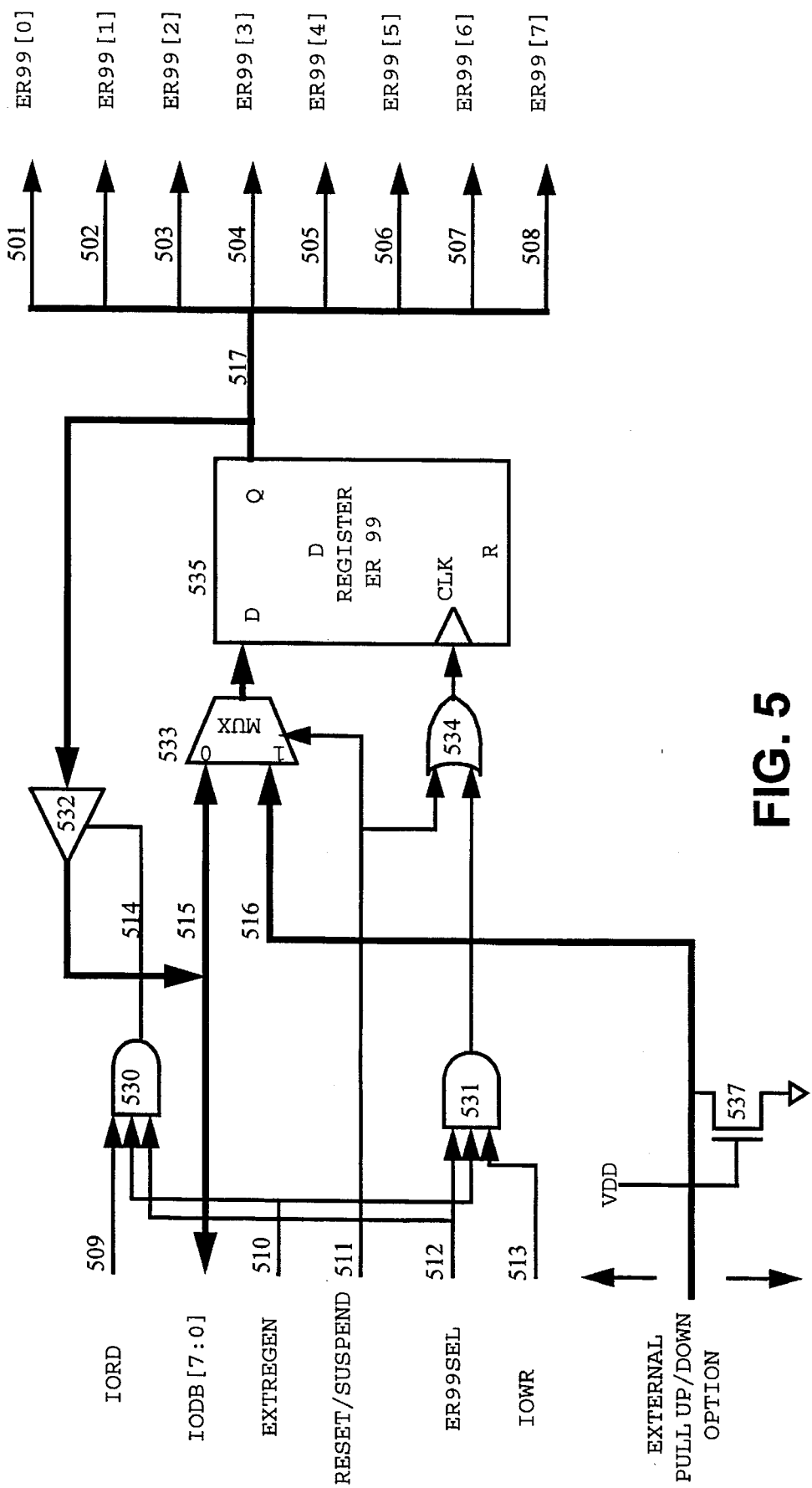
FIG. 5 illustrates a schematic diagram of the logic and the ER99 register that consists of eight D flip flops.

A schematic diagram of a portion of the register ER99 and the logic is illustrated in FIG. 5. FIG. 5 illustrates only one flip-flop of the register ER99. The register ER99 consists of eight similarly configured flip-flops with accompanying logic. The inputs 515 to the register ER99 are input to a multiplexer 533 whose output is then provided as the input to one of the flip-flops 535. The output of the flip flops 535 are provided as the control lines of the register ER99 and used to configure the interface unit and the integrated circuit through a logic system for the type of bus structure to be used.

Figure 6:
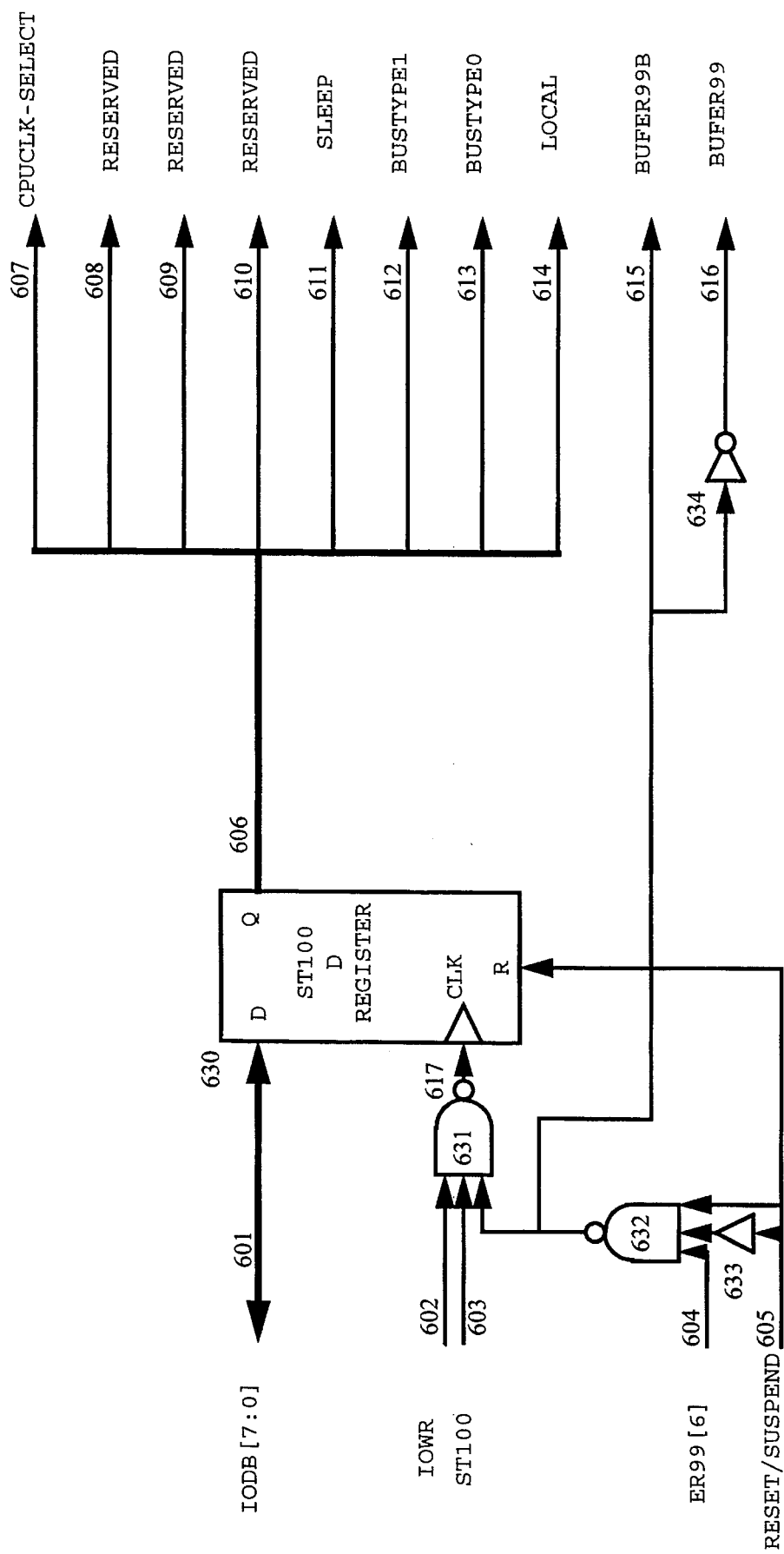
FIG. 6 illustrates a schematic diagram of logic and the ST100 register that consists of eight D flip flops. The appropriate output signal names are respectively assigned in order of the output from the individual D flip flops.

Similarly, a schematic diagram of a portion of the register ST100 and accompanying logic is illustrated in FIG. 6. FIG. 6 also illustrates one flip-flop and the register ST100 consists of eight similarly configured flip-flops with accompanying logic. The inputs 601 to the register ST100 are input directly to the flip-flops 630. The bit 6 line from the register ER99 is connected as the input 604 to the NAND gate 632 for disabling the ST100 register after the register ER99 has been written to. On reset, the reset signal line is connected to the input 605 of the NAND gate 632 through the inverter 633, the register ST100 is enabled and will be used again to configure the register ER99.

The register ER99 can also be hard-wired to override the ADS* pin and the function of the register ST100. The bits of the register ER99 are pulled down by inherent internal pull-down resistors. The bits of the register ER99 may be controlled by placing a pull-up or pull-down resistor on the respective M3D[X] pins externally, where X corresponds to the bit number. If the M3 D[6] pin is pulled up using a pull-up resistor, the bit 6 of the register ER99 is set, which disables the register ST100 and the ADS* pin. By setting the bit 6 of the register ER99 using a pull-up resistor and the pad M3 D[X] at required logic levels using pull-up or pull-down resistors, the system designer can override the function of the register ST100 and the ADS* pin.

Figure 7:
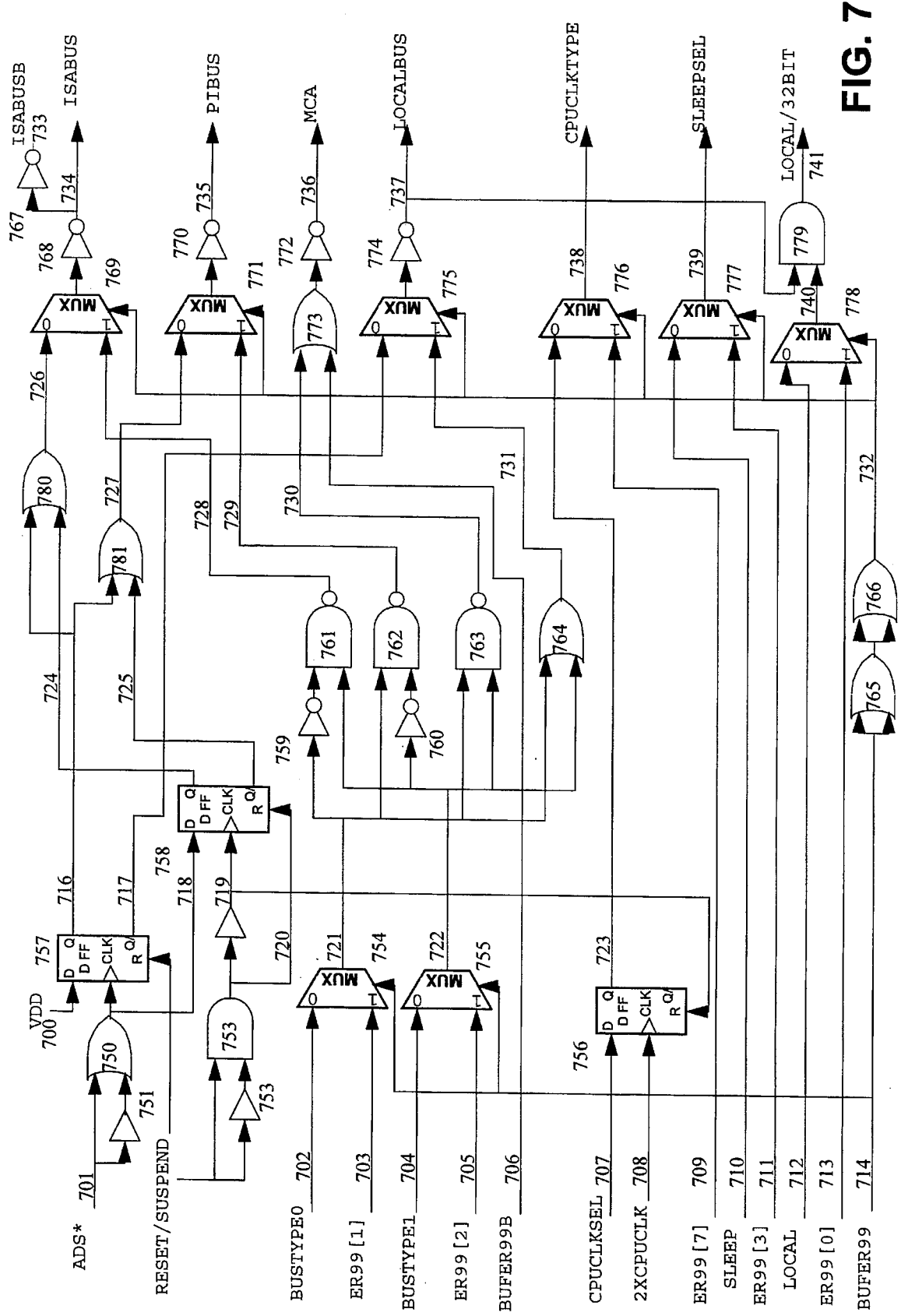
FIG. 7 illustrates a schematic diagram of the logic that determines the type of bus selected and the control signals generated that are distributed to internal portions of an integrated circuit.

FIG. 7 illustrates a schematic diagram of the logic that determines the type of bus selected and the control signals generated within the bus interface unit that are distributed to internal portions of the integrated circuit. More particularly, the circuit schematic of FIG. 7 illustrates how the signal lines from the register ER99 are used by the logic of the bus interface unit to set the control lines which specify the type of bus interface that is to be used. If a Local bus is to be used, then the data width and the clock speed are also indicated on the control lines.

If an ISA bus is to be interfaced to, then the control signal ISABUS, on the line 734, will be set by the logic. If a PI bus is to be interfaced to, then the control signal PIBUS, on the line 735, will be set by the logic. If a Local bus is to be interfaced to, then the control signal LOCALBUS, on the line 737, will be set by the logic. If the Local bus is to have a 2X clock then the control signal CPUCLKTYPE, on the line 738, will be set by the logic. If the Local bus is to have a 32 bit data width, then the control signal LOCAL/32 BIT on the line 741, will be set by the logic.

Figure 8:
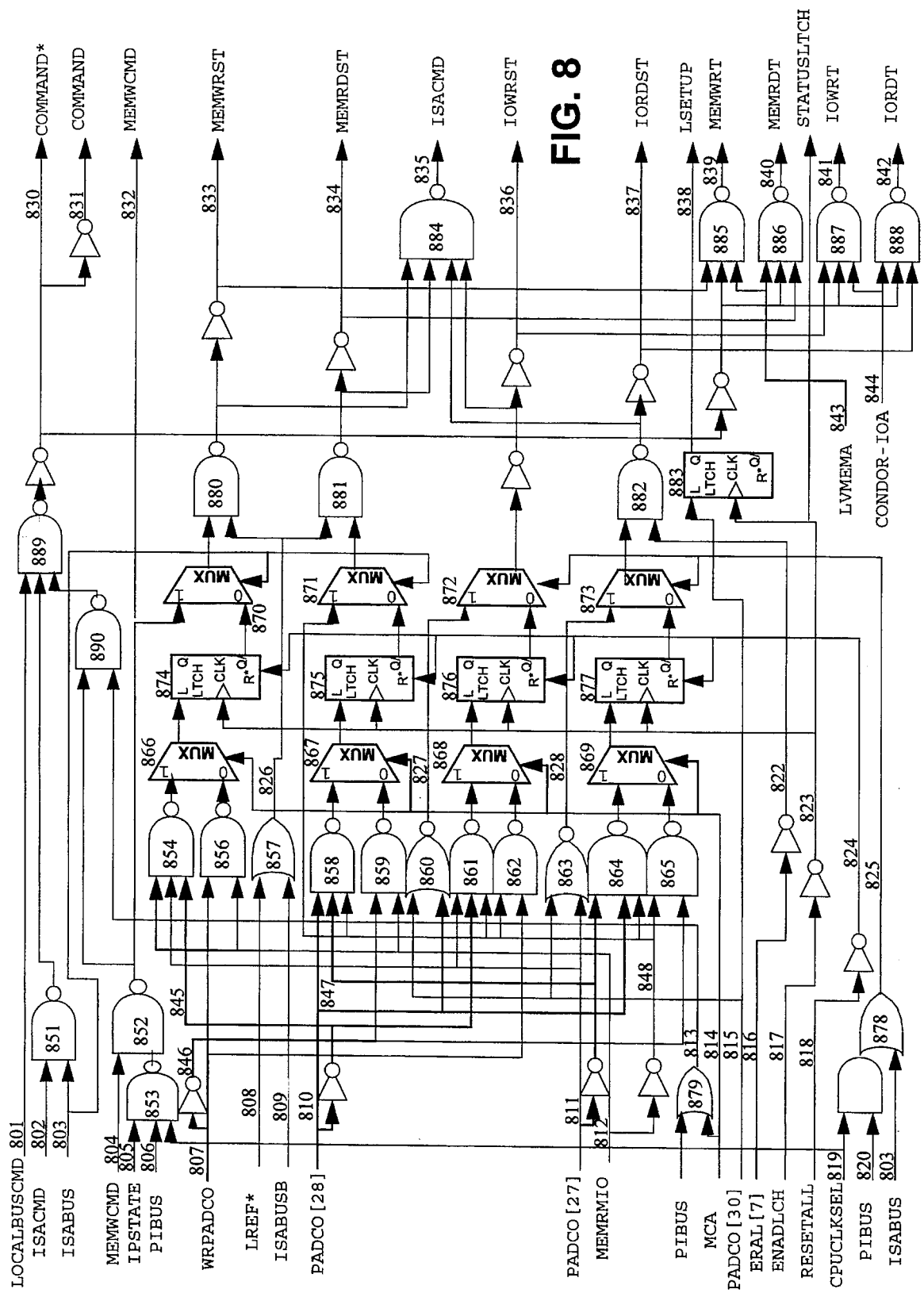
FIG. 8 illustrates a schematic diagram of the multifunctional input pins that support the multiple bus protocols and the logic that is required to do so.

FIG. 8 illustrates a schematic diagram of the multifunctional input pins, of the integrated circuit, that support the multiple bus protocols and the logic that is used. The logic illustrated by the schematic diagram of FIG. 8 shows how the commands are generated which configure the pads for use by the multiple bus protocols.

Figure 9:
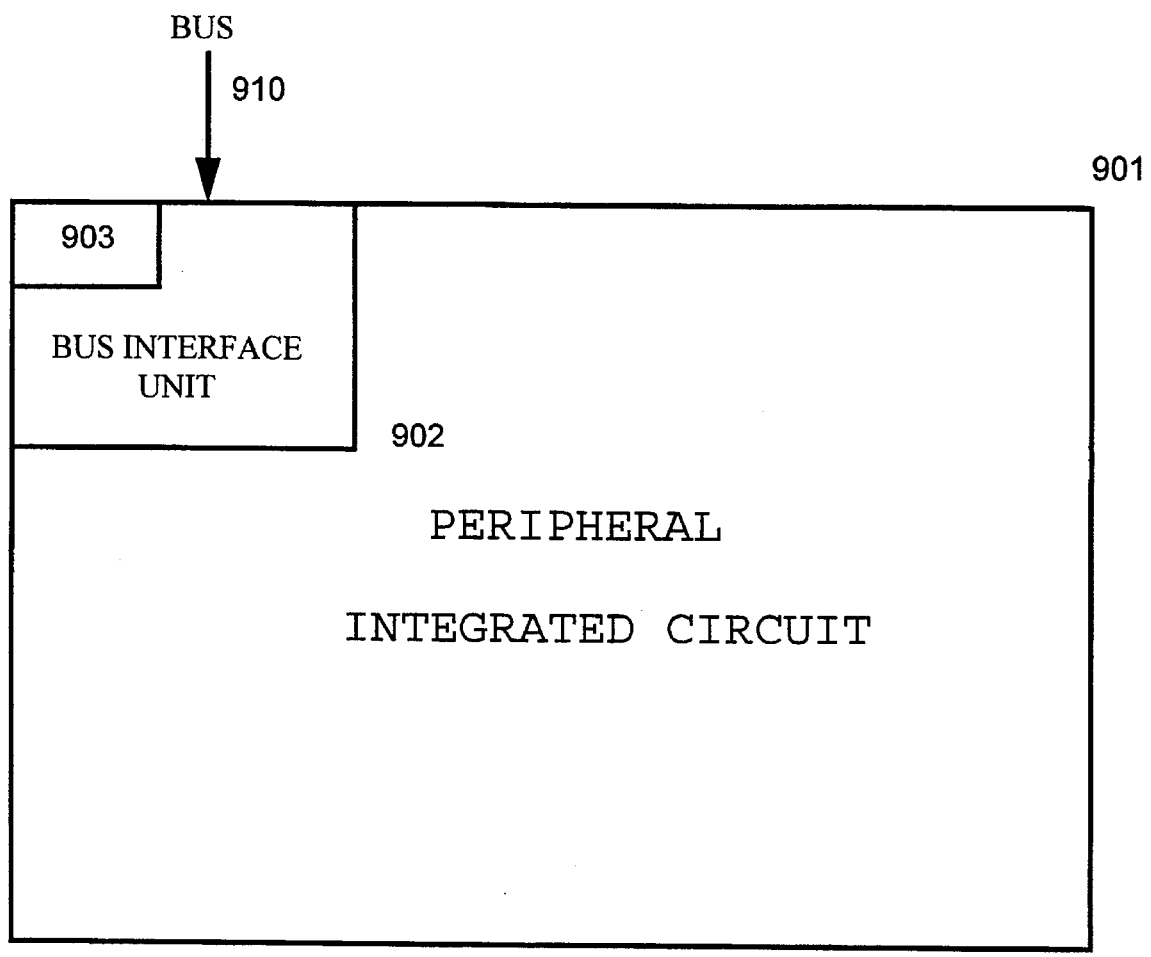
FIG. 9 illustrates a block diagram of the integrated circuit which contains the present invention. The present invention is within the Bus Interface Unit such that it sends control signals to logic internal and external to this block.

The automatic bus setting, sensing and switching apparatus of the present invention is designed to be incorporated as one portion of a peripheral integrated circuit as illustrated in FIG. 9. The present invention is a portion of the bus interface unit 902, illustrated as the block 903. The bus 910 from the microprocessor is input to the integrated circuit 901 through the bus interface unit 902 of the present invention. The bus interface unit 902 then sends control signals to logic which is internal and external to the integrated circuit.

Figure 10A:
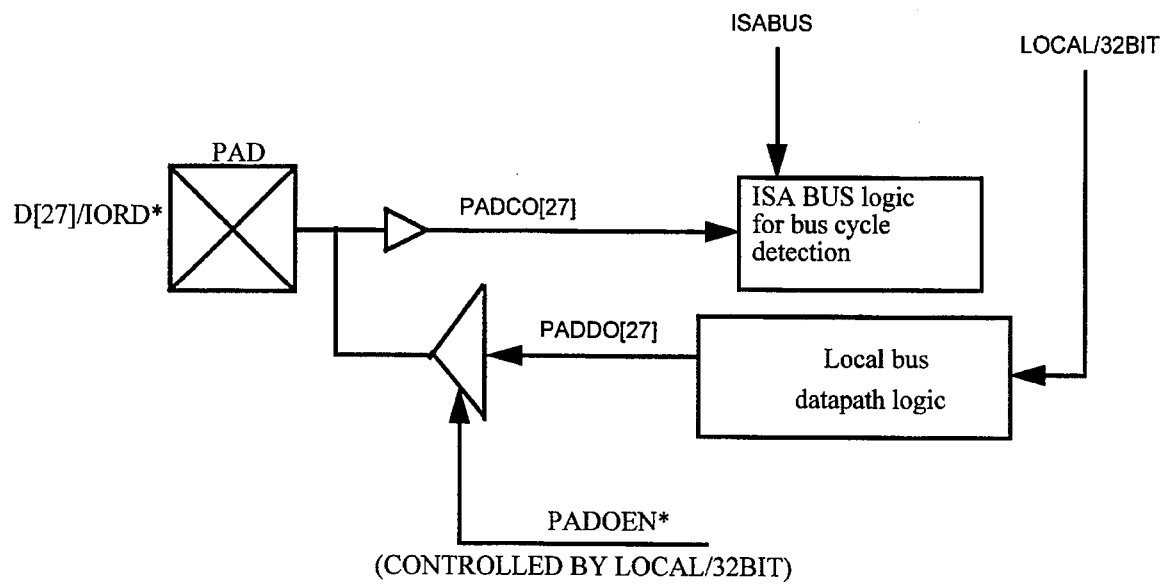
FIG. 10a illustrates the functions of a multi-functional pin which can be used as either a bidirectional or an input-only pin, depending on the bus that is being used.

The FIGS. 10a, 10b, 10c and 10d illustrate how the pins of the present invention can be used for multiple functions, depending on the bus that is being used. FIG. 10a illustrates how the pin D[27]/IORD* is used as either a bidirectional data bus pin or an input only pin, depending on the bus type that is being used. In a system where a local bus is being used, the pin D[27]/IORD* is a bidirectional data bus pin D[27], used for data transfers. If the local bus is only a 16 bit bus, then the pin D[27]/IORD* is not driven by any source. In a system where an ISA bus is being used, the pin D[27]/IORD* is a input pin IORD*, used only for inputs.

The function of the pin D[30]/AEN is similar to the function of the D[27]/IORD* pin illustrated in FIG. 10a. In a system where a local bus is being used, the pin D[30]/AEN is a bidirectional data bus pin D[30], used for data transfers. If the local bus is only a 16 bit bus, then the pin D[30]/AEN is not driven by any source. In a system where an ISA bus is being used, the pin D[30]/AEN is used as an input-only Address Enable pin.

The function of the pin D[28]/IOWR* is similar to the function of the D[27]/IORD* pin illustrated in FIG. 10a. In a system where a local bus is being used, the pin D[28]/IOWR* is a bidirectional data bus pin D[28], used for data transfers. If the local bus is only a 16 bit bus, then the pin D[28]/IOWR* is not driven by any source. In a system where an ISA bus is being used, the pin D[28]/IOWR* is used to indicate that an I/O write is taking place.

The function of the pin D[26]/PSTART# is also similar to the function of the D[27]/IORD* pin illustrated in FIG. 10a. In a system where a local bus is being used, the pin D[26]/PSTART# is a bidirectional data bus pin D[26], used for data transfers. If the local bus is only a 16 bit bus, then the pin D[26]/PSTART# is not driven by any source. In a system where a PI bus is being used, the pin D[26]/PSTART# is used indicate that a PI bus cycle has started and is also used to latch address and status inputs on the high-to-low transition.

The function of the pin D[24]/BALE is also similar to the function of the D[27]/IORD* pin illustrated in FIG. 10a. In a system where a local bus is being used, the pin D[24]/BALE is bidirectional data bus pin D[24], used for data transfers. If the local bus is only a 16 bit bus, then the pin D[24]/BALE is not driven by any source. In an ISA bus system, the D[24]/BALE pin is used to latch a section of the system address bus.

Figure 10B:
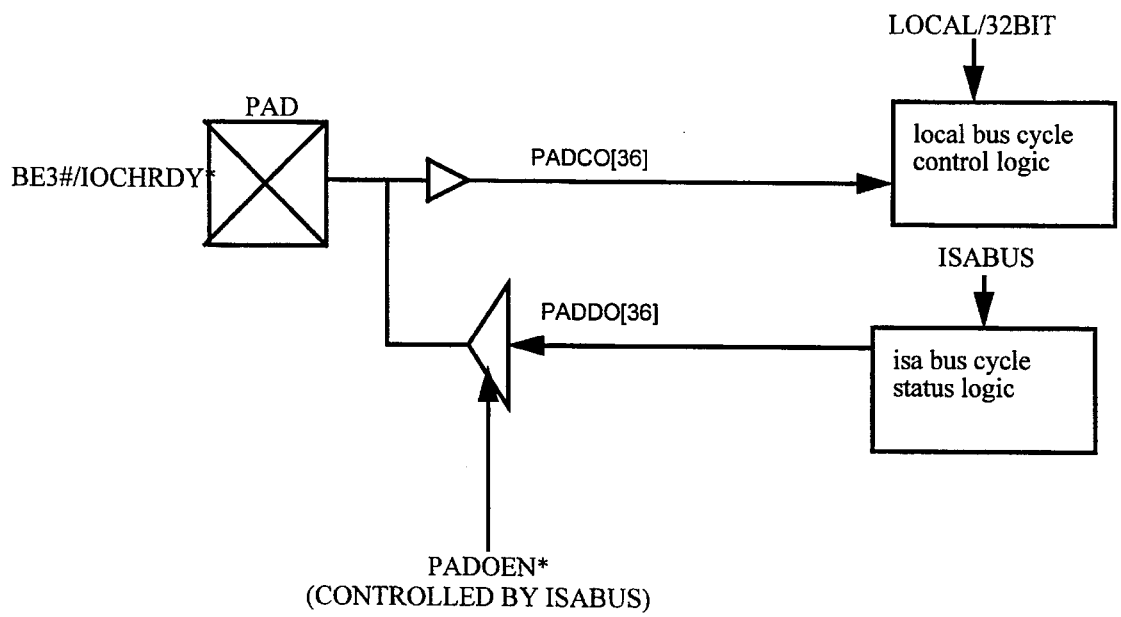
FIG. 10b illustrates the functions of a multi-functional pin which can be used as either an input-only or an output-only pin, depending on the bus that is being used.

An example of a pin which is used as an input only pin in a local bus configuration and as an output only pin in an ISA bus configuration is illustrated in FIG. 10b. FIG. 10b illustrates the multiple functions of the BE3#/IOCHRDY* pin. In a system where a local bus is being used, the BE3#/IOCHRDY* pin is used as the input-only Byte Enable Control pin BE3*. In a system where an ISA bus is being used, the BE3#/IOCHRDY* pin is used as the I/O Channel Ready pin IOCHRDY which indicates that additional wait states are to be inserted into the current display memory read or write cycle.

The function of the ASEL/ROMSEL* pin is similar to the function of the BE3#/IOCHRDY* pin illustrated in FIG. 10b. If a local bus is being used, the ASEL/ROMSEL* pin is used as the linear memory select pin ASEL, which enables linear memory addressing select. If an ISA bus is being used, the ASEL/ROMSEL* pin is used as the ROM select pin ROMSEL*, which selects the ROM space where the VGA BIOS is stored.

The function of the WR#/PWR#/MEMCS16* pin is similar to the function of the BE3#/IOCHRDY* pin illustrated in FIG. 10b. If a local bus is being used, the WR#/PWR#/MEMCS16* pin is used as a Write/Read pin WR#, which indicates whether a write or read operation is to occur. If a PI bus is being used, then the WR#/PWR#/MEMCS16* pin is used as a Write/Read pin PWR# which also indicates whether a write or read operation is to occur. If an ISA bus is being used, the WR#/PWR#/MEMCS16* pin is used as a Memory Chip Select pin MEMCS16 *, which is used to indicate that a 16-bit memory operation at the address currently on the bus can be executed.

Figure 10C:
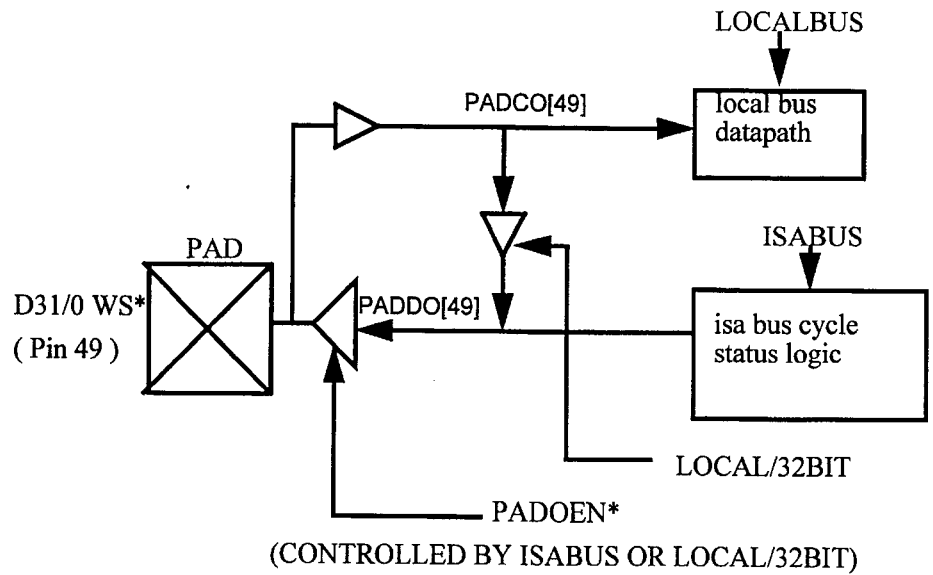
FIG. 10c illustrates the functions of a multi-functional pin which can be used as either a bidirectional or an output-only pin, depending on the bus that is being used.

An example of a pin which is used as a bidirectional pin or an output-only pin, depending on the bus being used, is illustrated in FIG. 10c. FIG. 10c illustrates the multiple functions of the D[31]/0WS* pin. If a local bus is being used, then the D[31]/0WS* pin is used as a bidirectional data pin D[31]. If an ISA bus is being used, then the D[31]/0WS* pin is used as a Zero Wait State pin 0WS* which is used to indicate that the current cycle can be completed without any additional wait states.

The function of the D[29]/IOCS16* pin is similar to the function of the D[31]/0WS* pin illustrated in FIG. 10c. If a local bus is being used, the D[29]/IOCS16* pin is used as a bidirectional data bit pin D[29]. If an ISA bus is being used however, the D[29]/IOCS16 pin is used as the I/O Chip Select pin IOCS16, which is used to indicate that a 16 bit I/O operation at the address currently on the bus can be executed.

Figure 10D:
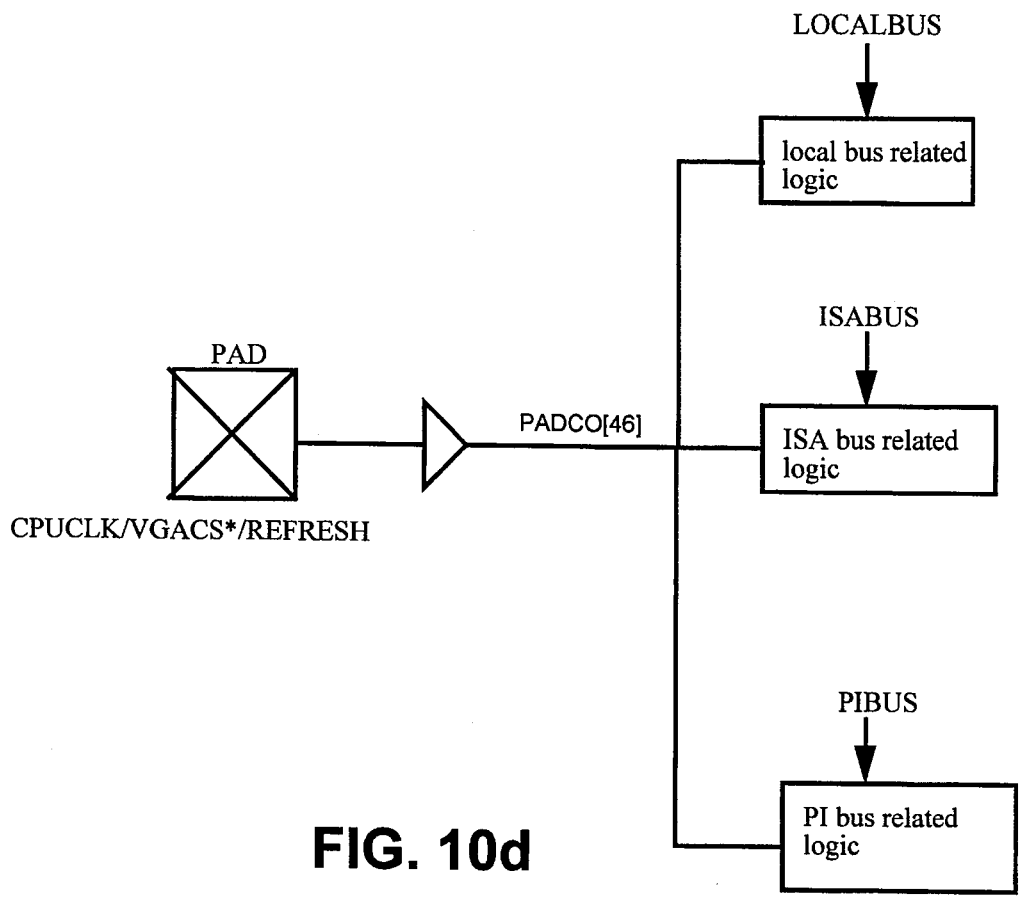
FIG. 10d illustrates the functions of a multi-functional pin which is used as an input-only pin, but has different functions, depending on the bus that is being used.

An example of a pin which is always used as input pin, but with different functions is illustrated in FIG. 10d. FIG. 10d illustrates the multiple functions of the CPUCLK/VGACS*/REFRESH pin. If a local bus is being used, the CPUCLK/VGACS*/REFRESH pin is used to receive the CPU clock. If an ISA bus is being used, the CPUCLK/VGACS*/REFRESH pin is used as a Refresh pin REF*, which indicates that a system DRAM refresh is occurring. If a PI bus is being used, the CPUCLK/VGACS*/REFRESH pin is used as a VGA access pin VGACS#, which indicates that an access has occurred to a user-defined VGA memory address space.

The function of the BE1#/A1/SA1 pin is similar to the function of the CPUCLK/VGACS*/REFRESH pin illustrated in FIG. 10d. If either a 386DX or a 486DX microprocessor, which each have a 32 bit data bus, are being used then the BE1#/A1/SA1 pin is used as a Byte Enable pin BE1#. If a 386SX microprocessor, which has a 16 bit data bus, is being used then the BE1 #/A1/SA1 pin is used as the address pin A1. If an ISA bus is being used, the BE1 #/A1/SA1 pin is used as a System Address pin SA1.

The function of the BE0#/BLE#/SA0 pin is similar to the function of the CPUCLK/VGACS*/REFRESH pin illustrated in FIG. 10d. If a 386DX or a 486DX microprocessor is being used then the BE0#/BLE#/SA0 pin is used as a Byte Enable pin BE0#. If a 386SX microprocessor is being used then the BE0#/BLE#/SA0 pin is being used as a Byte Low Enable pin BLE#. If an ISA bus is being used, the BE0#/BLE#/SA0 pin is used as a System Address pin SA0.

The function of the PCMD#/SMEMW*/CPURDY* pin is similar to the function of the CPUCLK/VGACS*/REFRESH pin illustrated in FIG. 10d. If a PI bus is being used, then the PCMD#/SMEMW*/CPURDY* pin is used to indicate that a valid PI bus cycle is in progress. During read cycles of a PI bus, the PCMD#/SMEMW*/CPURDY* pin can be used as an output enable and during write cycles of a PI bus, the PCMD#/SMEMW*/CPURDY* pin can be used to latch data onto the bus. If an ISA bus is being used, then the PCMD#/SMEMW*/CPURDY* pin is used as a memory write pin SMEMW*, which is used to indicate that a memory write is taking place. If a local bus is being used, then the PCMD#/SMEMW*/CPURDY* pin is used as CPU ready pin CPURDY*, which indicates the end of a current cycle.

The function of the MIO#/PMIO#/SMEMR* pin is also similar to the function of the CPUCLK/VGACS*/REFRESH pin illustrated in FIG. 10d. The function of the MIO#/PMIO#/SMEMR* pin has been described above in conjunction with FIGS. 4a, 4b and 4c.

The function of the BE2#/BHE#/SBHE# pin is similar to the function of the CPUCLK/VGACS*/REFRESH pin illustrated in FIG. 10d. If a local bus is being used with a 386DX or 486DX microprocessor, the BE2#/BHE#/SBHE# pin is used as a Byte Enable control pin BE2#. If a local bus is being used with a 386SX microprocessor, the BE2#/BHE#/SBHE# pin is used as a Byte High Enable pin BHE# which is used to determine the width and alignment of a data transfer. If a PI bus is being used, then the BE2#/BHE#/SBHE# pin is used as a System Byte High Enable pin SBHE# which is also used to determine the width and alignment of a data transfer.

The pins described above are only some of the pins which have multiple functions in conjunction with the preferred embodiment. The function of pins not described above is similar to the function of the pins described.

Figure 11:
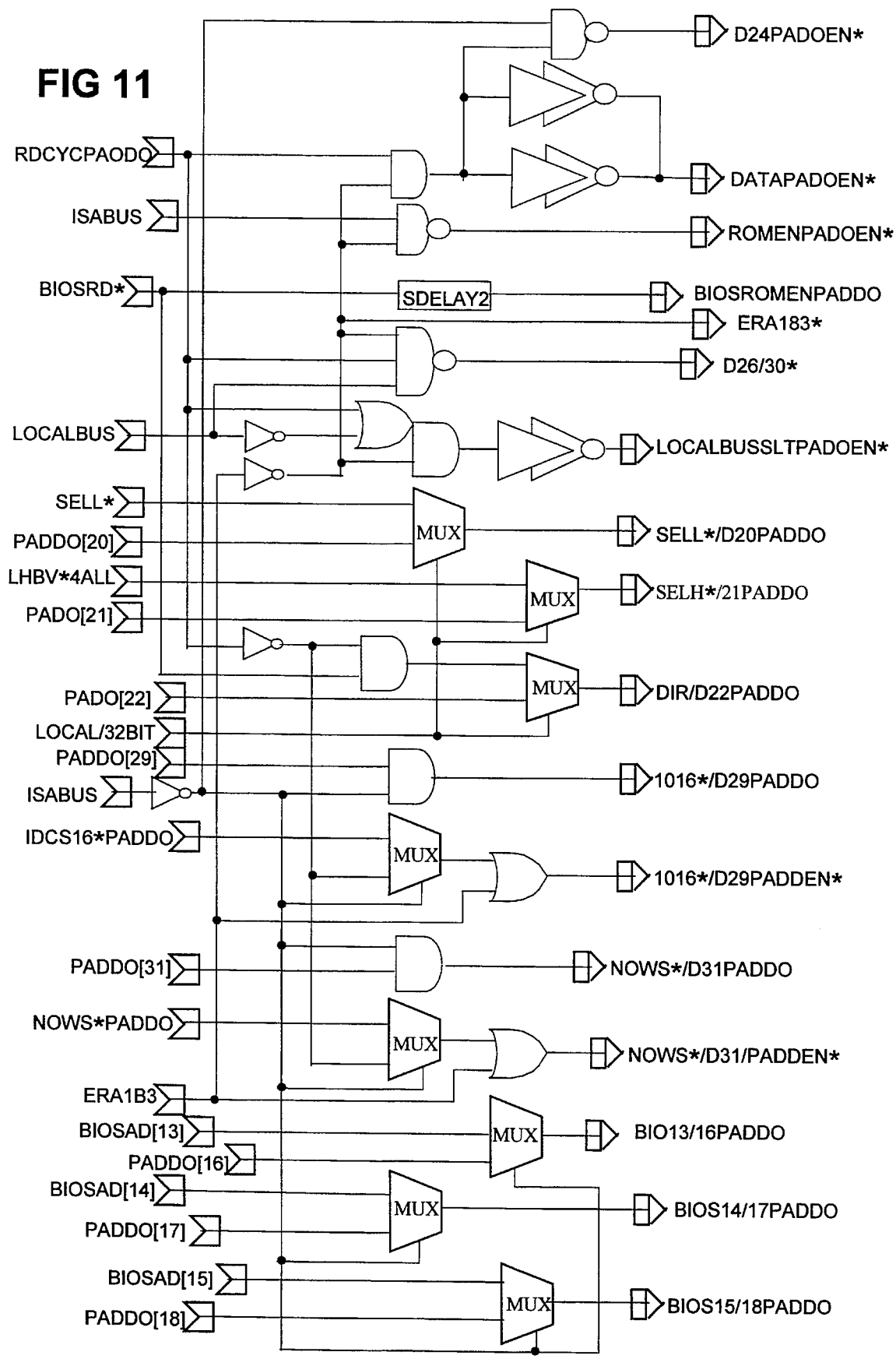
FIG. 11 illustrates how a multi-functional I/O pad connects with the integrated circuit and the host system, when the selected pins of the integrated circuit is in the output mode.
Figure 12A:
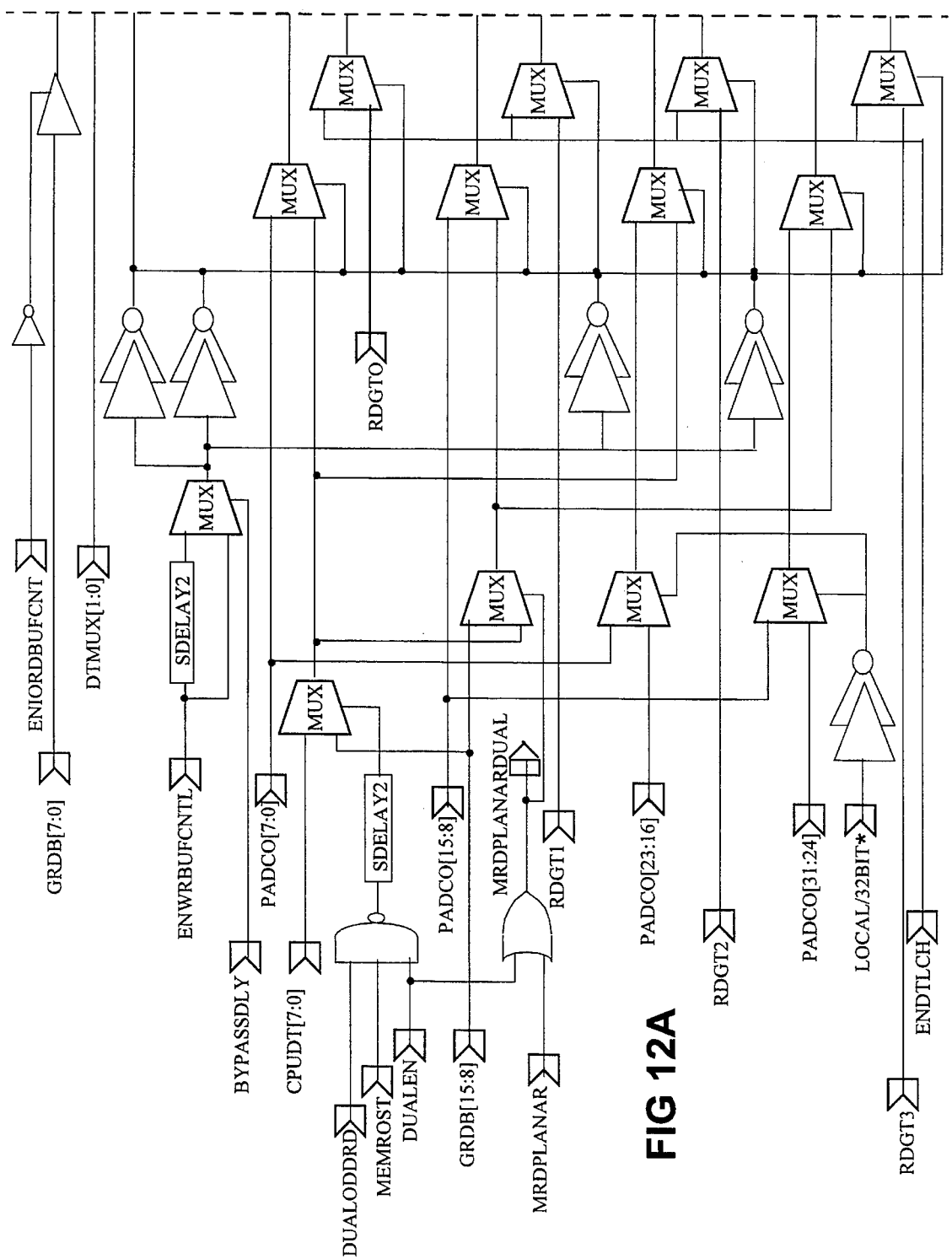
FIG. 12A is a first portion of a block diagram illustrating how a multi-functional I/O pad connects with the integrated circuit and the host system, when the integrated circuit is in the input mode.
Figure 12B:
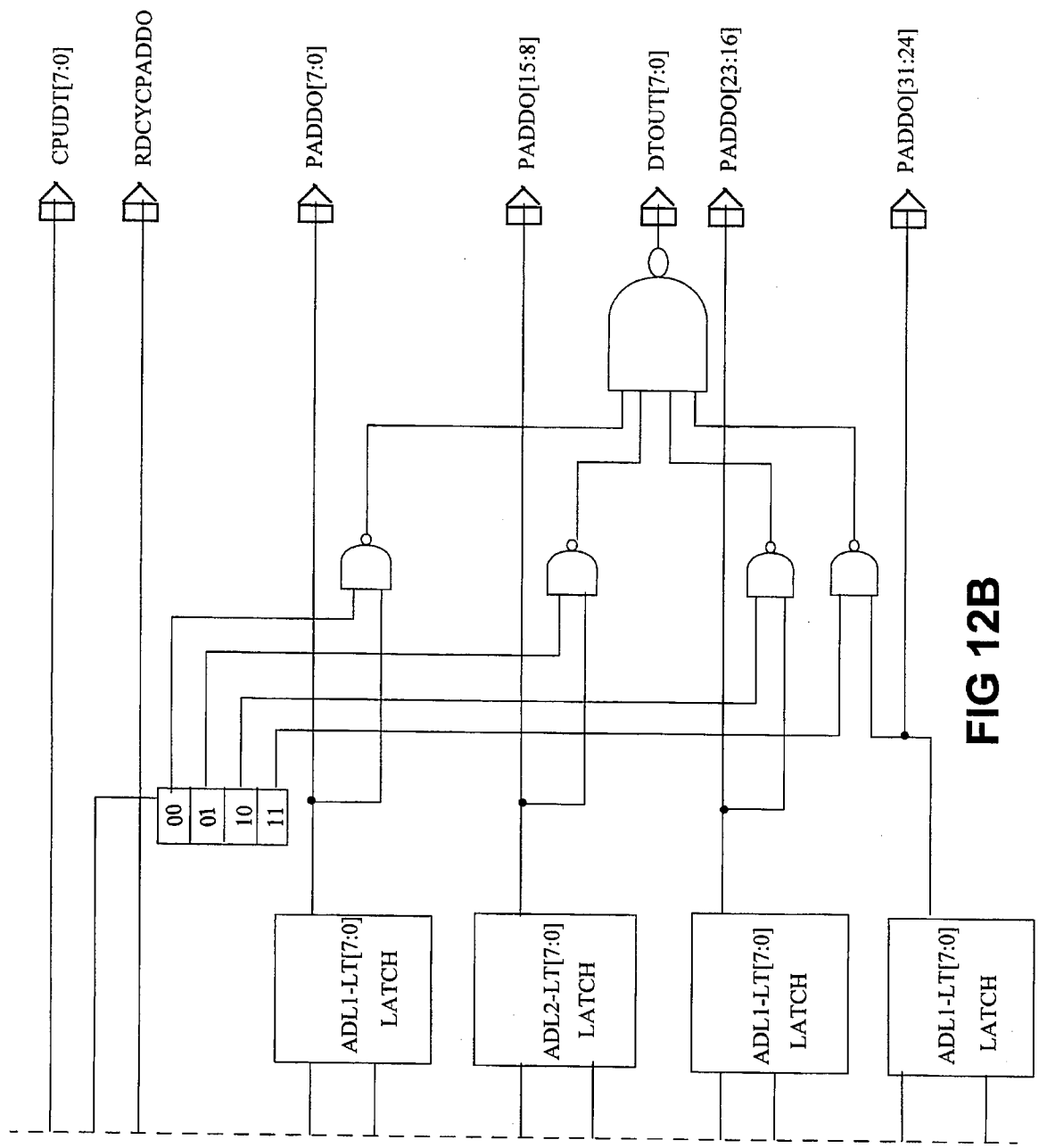
FIG. 12B is a second portion of a block diagram illustrating how a multi-functional I/O pad connects with the integrated circuit and the host system, when the integrated circuit is in the input mode.

FIGS. 11 and 12 illustrate how the multi-function I/O pads connect with the integrated circuit and the host system in which it resides. The padco pin on the pad is a path from the pad to the logic inside the chip which is always enabled, regardless of whether the pad is in output mode or in input mode. If the integrated circuit is in input mode, and is reading the logic level on the pad, the padco signal is routed to the appropriate logic section inside the integrated circuit. If the integrated circuit is in output mode, where it is sending data to the host system, it does not care about the state of the padco pin. When the integrated circuit is in output mode as illustrated in FIG. 11, the signal padoen* is driven low so that whatever is connected to the padco pin of the pad appears on the pad output to be sensed by the system. FIG. 12 illustrates how the signals connected to the paddo signal of the I/O pads are controlled by logic internal to the integrated circuit.

An Advance Data Book, dated January 1993, for a High-Resolution Super VGA LCD Controller for Monochrome/Color Notebook Computers, part No. CL-GD6440, published by Cirrus Logic, which includes details and specifications of the bus interface unit of the present invention is included as Appendix A and attached hereto. An Application Book, dated Jul.28, 1993, for the part No. CL-GD6440, also published by Cirrus Logic, includes further details and specifications of the bus interface unit of the present invention and is included as Appendix B and attached hereto.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. An automatic bus setting, sensing and switching interface apparatus for configuring a first integrated circuit to interface with other integrated circuits via a selected one of a plurality of bus structures, the integrated circuit having a plurality of pins coupled to a bus, wherein there is no identity of a function and mode assigned for all the pins for any one of the bus structures relative to another bus structure, the apparatus comprising:

a. a sensor for detecting a logic level of a single bus signal representative of the selected one of the bus structures to be used, the sensor coupled to the first integrated circuit; and b. a logic structure coupled to the sensor and to the first integrated circuit for automatically configuring the first integrated circuit to communicate with the other integrated circuits according to the selected one of the bus structures wherein at least one of the pins has a different function and mode for one selection of bus structure than for another selection of bus structure.

2. The apparatus as claimed in claim 1 wherein the plurality of bus structures is comprised of three bus structures, including an ISA bus structure, a PI bus structure and a Local bus structure.

3. The apparatus as claimed in claim 2 wherein the logic level for an ISA bus structure is a logical low voltage, the logic level for a PI bus structure is a logical high voltage and the logic level for a Local bus structure is a transition between a logical low voltage and a logical high voltage.

4. The apparatus as claimed in claim 3 wherein the logic structure for automatically configuring the first integrated circuit is comprised of an interface unit coupled to the first integrated circuit.

5. The apparatus as claimed in claim 4 wherein the interface unit for a local bus structure is configured for a 1X clock and a 16 bit data width.

6. An automatic bus setting, sensing and switching interface apparatus for configuring a first integrated circuit to interface with other integrated circuits via a selected one of a plurality of bus structures, the integrated circuit having a plurality of pins coupled to a bus, wherein there is no identity of a function and mode assigned for all the pins for any one of the bus structures relative to another bus structure, the apparatus comprising:

a. a register for storing a code representative of parameters of the selected one of the bus structures to be used wherein the code is written into the register by a system BIOS, the register coupled to the first integrated circuit; and b. a logic structure coupled to the register and to the first integrated circuit for automatically configuring the first integrated circuit to communicate with the other integrated circuits according to the parameters of the selected one of the bus structures wherein at least one of the pins has a different function and mode for one selection of bus structure than for another selection of bus structure.

7. The apparatus as claimed in claim 6 wherein the plurality of bus structures is comprised of three bus structures, including an ISA bus structure, a PI bus structure and a Local bus structure.

8. The apparatus as claimed in claim 7 wherein the logic structure for automatically configuring the first integrated circuit is comprised of an interface unit coupled to the first integrated circuit.

9. The apparatus as claimed in claim 8 wherein the interface unit for a local bus structure can be configured to either a 16 bit data width or a 32 bit data width as specified by the code.

10. The apparatus as claimed in claim 9 wherein the interface unit for a local bus structure can be configured to either a 1X clock or a 2X clock as specified by the code.

11. An automatic bus setting, sensing and switching interface apparatus for configuring a first integrated circuit to interface with other integrated circuits via a selected one of a plurality of bus structures, the integrated circuit having a plurality of pins coupled to a bus, wherein there is no identity of a function and mode assigned for all the pins for any one of the bus structures relative to another bus structure, the apparatus comprising:

a. a sensor for detecting a logic level of a single bus signal representative of the selected one of the bus structures to be used, the sensor coupled to the first integrated circuit;

b. a register for storing a code representative of parameters of the selected one of the bus structures to be used wherein the code is written into the register by a system BIOS, the register coupled to the first integrated circuit; and c. a logic structure coupled to the register and to the first integrated circuit for automatically configuring the first integrated circuit to communicate with the other integrated circuits according to the parameters of the selected one of the bus structures wherein at least one of the pins has a different function and mode for one selection of bus structure than for another selection of bus structure.

12. The apparatus as claimed in claim 11 wherein the plurality of bus structures is comprised of three bus structures, including an ISA bus structure, a PI bus structure and a Local bus structure.

13. The apparatus as claimed in claim 12 wherein the logic level for an ISA bus structure is a logical low voltage, the logic level for a PI bus structure is a logical high voltage and the logic level for a Local bus structure is a transition between a logical low voltage and a logical high voltage.

14. The apparatus as claimed in claim 13 wherein the logic structure is comprised of an interface unit coupled to the first integrated circuit.

15. The apparatus as claimed in claim 14 wherein the interface unit for a local bus structure can be configured to either a 16 bit data width or a 32 bit data width as specified by the code.

16. The apparatus as claimed in claim 15 wherein the interface unit for a local bus structure can be configured to either a 1X clock or a 2X clock as specified by the code.

17. An automatic bus setting, sensing and switching interface apparatus for configuring a first integrated circuit to interface with other integrated circuits via a selected one of a plurality of bus structures, the integrated circuit having a plurality of pins coupled to a bus, wherein there is no identity of a function and mode assigned for all the pins for any one of the bus structures relative to another bus structure, the apparatus comprising:
   a. means for detecting a logic level of a single bus signal representative of the selected one of the bus structures to be used, the means for detecting coupled to the first integrated circuit; and
   b. means for automatically configuring the first integrated circuit to communicate with the other integrated circuits according to the selected one of the bus structures wherein at least one of the pins has a different function and mode for one selection of bus structure than for another selection of bus structure.

18. The apparatus as claimed in claim 17 wherein the plurality of bus structures is comprised of three bus structures, including an ISA bus structure, a PI bus structure and a Local bus structure.

19. The apparatus as claimed in claim 18 wherein the logic level for an ISA bus structure is a logical low voltage, the logic level for a PI bus structure is a logical high voltage and the logic level for a Local bus structure is a transition between a logical low voltage and a logical high voltage.

20. The apparatus as claimed in claim 19 wherein the means for automatically configuring the first integrated circuit is comprised of an interface unit coupled to the first integrated circuit.

21. The apparatus as claimed in claim 20 wherein the interface unit for a local bus structure is configured for a 1X clock and a 16 bit data width.

22. An automatic bus setting, sensing and switching interface apparatus for configuring a first integrated circuit to interface with other integrated circuits via a selected one of a plurality of bus structures, the integrated circuit having a plurality of pins coupled to a bus, wherein there is no identity of a function and mode assigned for all the pins for any one of the bus structures relative to another bus structure, the apparatus comprising:
   a. means for storing a code representative of parameters of the selected one of the bus structures to be used wherein the code is written into the means for storing by the system BIOS, the means for storing coupled to the first integrated circuit; and
   b. means for automatically configuring the first integrated circuit to communicate with the other integrated circuits according to the selected one of the bus structures.

23. The apparatus as claimed in claim 22 wherein the plurality of bus structures is comprised of three bus structures, including an ISA bus structure, a PI bus structure and a Local bus structure.

24. The apparatus as claimed in claim 23 wherein the means for automatically configuring the first integrated circuit is comprised of an interface unit coupled to the first integrated circuit.

25. The apparatus as claimed in claim 24 wherein the interface apparatus for a local bus structure can be configured to either a 16 bit data width or a 32 bit data width as specified by the code.

26. The apparatus as claimed in claim 25 wherein the interface apparatus for a Local bus structure can be configured to either a 1X clock or a 2X clock as specified by the code.

27. The apparatus as claimed in claim 26 wherein the means for storing is comprised of a first storage register and a second storage register.

28. The apparatus as claimed in claim 27 wherein the first storage register is disabled after the code has been stored in the second storage register.

29. An automatic bus setting, sensing and switching interface apparatus for configuring a first integrated circuit to interface with other integrated circuits via a selected one of a plurality of bus structures, the integrated circuit having a plurality of pins coupled to a bus, wherein there is no identity of a function and mode assigned for all the pins for any one of the bus structures relative to another bus structure, the apparatus comprising:
   a. means for detecting a logic level of a single bus signal representative of the selected one of the bus structures to be used, the means for detecting coupled to the first integrated circuit;
   b. means for storing a code representative of parameters of the selected one of the bus structures to be used wherein the code is written into the means for storing by the system BIOS, the means for storing coupled to the first integrated circuit; and
   c. means for automatically configuring the first integrated circuit to communicate with the other integrated circuits according to the selected one of the bus structures wherein at least one of the pins has a different function and mode for one selection of bus structure than for another selection of bus structure.

30. The apparatus as claimed in claim 29 wherein the plurality of bus structures is comprised of three bus structures, including an ISA bus structure, a PI bus structure and a Local bus structure.

31. The apparatus as claimed in claim 30 wherein the logic level for an ISA bus structure is a logical low voltage, the logic level for a PI bus structure is a logical high voltage and the logic level for a Local bus structure is a transition between a logical low voltage and a logical high voltage.

32. The apparatus as claimed in claim 31 wherein the means for automatically configuring the first integrated circuit is comprised of an interface unit coupled to the first integrated circuit.

33. The apparatus as claimed in claim 32 wherein the interface apparatus for a local bus structure can be configured to either a 16 bit data width or a 32 bit data width as specified by the code.

34. The apparatus as claimed in claim 33 wherein the interface apparatus for a Local bus structure can be configured to either a 1X clock or a 2X clock as specified by the code.

35. The apparatus as claimed in claim 34 wherein the means for storing is comprised of a first storage register and a second storage register.

36. The apparatus as claimed in claim 35 wherein the first storage register is disabled after the code has been stored in the second storage register.

37. A method for automatically sensing a signal and configuring a first integrated circuit to interface with other integrated circuits via a selected one of a plurality of bus structures, comprising the steps of:
   a. detecting a logic level of a single bus signal representative of a selected one of the bus structures to be used; and
   b. configuring the first integrated circuit to communicate with the other integrated circuits according to the selected one of the bus structures wherein at least one of the pins has a different function and mode for one selection of bus structure than for another selection of bus structure.

38. The method as claimed in claim 37 wherein the plurality of bus structures includes an ISA bus structure, a PI bus structure and a local bus structure.

39. The method as claimed in claim 38 wherein the logic level for an ISA bus structure is a logical low voltage, the logic level for a PI bus structure is a logical high voltage and the logic level for a Local bus structure is a transition between a logical low voltage and a logical high voltage.

40. The method as claimed in claim 39 wherein the interface unit for a local bus structure is configured for a 1X clock and a 16 bit data width.

41. A method for automatically sensing a signal and configuring an interface within a first integrated circuit to interface with other integrated circuits via a selected one of a plurality of bus structures, the integrated circuit having a plurality of pins coupled to a bus, wherein there is no identity of a function and mode assigned for all the pins for any one of the bus structures relative to another bus structure, comprising the steps of:
   a. storing in a register a code representative of parameters of the selected one of the bus structures to be used wherein the code is stored in the register by a system BIOS; and
   b. automatically configuring the first integrated circuit to communicate with the other integrated circuits according to the selected one of the bus structures wherein at least one of the pins has a different function and mode for one selection of bus structure than for another selection of bus structure.

42. The method as claimed in claim 41 wherein the plurality of bus structures includes an ISA bus structure, a PI bus structure and a Local bus structure.

43. The method as claimed in claim 42 wherein the parameters represented by the code are a clock speed and a data width.

44. The method as claimed in claim 43 wherein the clock speed for a local bus structure can be either 1X or 2X and the data width can be either 16 bit or 32 bit as specified by the code.

45. A method for automatically sensing a signal and configuring an interface within a first integrated circuit to interface with other integrated circuits via a selected one of a plurality of bus structures, comprising the steps of:
   a. detecting a logic level of a single bus signal representative of the selected one of the bus structures to be used;
   b. storing in a register a code representative of parameters of the selected one of the bus structures to be used wherein the code is stored in the register by a system BIOS; and
   c. automatically configuring the first integrated circuit to communicate with the other integrated circuits according to the selected one of the bus structures.

46. The method as claimed in claim 45 wherein the plurality of bus structures includes an ISA bus structure, a PI bus structure and a Local bus structure.

47. The method as claimed in claim 46 wherein the logic level for an ISA bus structure is a logical low voltage, the logic level for a PI bus structure is a logical high voltage and the logic level for a Local bus structure is a transition between a logical low voltage and a logical high voltage.

48. The method as claimed in claim 47 wherein the parameters represented by the code are a clock speed and a data width.

49. The method as claimed in claim 48 wherein the clock speed for a Local bus structure can be either 1X or 2X and the data width can be either 16 bit or 32 bit as specified by the code.

50. An automatic bus setting, sensing and switching interface apparatus for configuring a first integrated circuit to interface with other integrated circuits via a selected one of a plurality of bus structures, the first integrated circuit having a predetermined number of pins, the integrated circuit having plurality of pins coupled to a bus, wherein there is no identity of a function and mode assigned for all the pins for any one of the bus structures relative to another bus structure, the apparatus comprising:
   a. a first pin for receiving a single bus signal representative of the selected one of the bus structures to be used, the first pin coupled to the first integrated circuit;
   b. a detection signal logic structure for detecting a logic level of the bus signal received by the first pin, the detection signal logic structure coupled to the first pin;
   c. a first storage register for storing a code, the code representing parameters of the selected one of the bus structures to be used, the first storage register coupled to the first integrated circuit;
   d. a second storage register for storing the code from the first storage register, the second storage register coupled to the first storage register; and
   e. a configuration signal logic structure for storing the code from the first storage register into the second storage register and automatically configuring the interface apparatus and the pins of the first integrated circuit to interface via the selected one of the bus structures wherein the configuration signal logic structure is coupled to the integrated circuit wherein at least one of the pins has a different function and mode for one selection of bus structure than for another selection of bus structure.

51. The apparatus as claimed in claim 50 wherein the plurality of data bus structures is comprised of three bus structures, including an ISA bus structure, a PI bus structure and a Local bus structure.

52. The apparatus as claimed in claim 51 wherein the logic level for an ISA bus structure is a logical low voltage, the logic level for a PI bus structure is a logical high voltage and the logic level for a Local bus structure is a transition between a logical low voltage and a logical high voltage.

53. The apparatus as claimed in claim 52 wherein the interface apparatus for a Local bus structure can be configured to either a 16 bit data width or a 32 bit data width as specified by the code.

54. The apparatus as claimed in claim 53 wherein the interface apparatus for a Local bus structure can be configured to either a 1X clock or a 2X clock as specified by the code.

55. The apparatus as claimed in claim 50 wherein the configuration signal logic structure also disables the first storage register after the code has been stored in the second storage register.

56. A method for automatically sensing a signal and configuring an interface within a first integrated circuit to interface with other integrated circuits, comprising the steps of:

a. automatically detecting if a bus signal pin is at a logical low voltage level and if the bus signal pin is at the logical low voltage level configuring the interface to communicate with the other integrated circuits via an ISA bus structure;

b. automatically detecting if a bus signal pin is at a logical high voltage level and if the bus signal pin is at the logical high voltage level configuring the interface to communicate with the other integrated circuits via a PI bus structure; and c. automatically detecting if a bus signal pin is transitioning between a logical low voltage level and a logical high voltage level and if the bus signal pin is transitioning, then:

(1) configuring the interface to communicate with the other integrated circuits via a Local bus structure having a 16 bit data width and a 1X clock;

(2) storing a code in a first storage register, the code representing parameters of the Local bus structure to be used;

(3) storing the code from the first storage register into a second storage register; and (4) configuring the interface apparatus and pins of the integrated circuit for the parameters of the Local bus structure represented by the code stored in the second storage register.

57. The method as claimed in claim 56 further comprising the step of disabling the first storage register after storing the code from the first storage register into the second storage register.

58. The method as claimed in claim 57 wherein the code represents the data width to be used if the interface is configured for a Local bus structure.

59. The method as claimed in claim 58 wherein the code further represents the clock speed to be used if the interface is configured for a Local bus structure.

* * * * *